United States Patent
Cimberio et al.

(10) Patent No.: US 11,187,426 B2
(45) Date of Patent: Nov. 30, 2021

(54) METHOD AND DEVICE FOR CONTROLLING THE FLOW OF FLUID IN AN AIR-CONDITIONING AND/OR HEATING SYSTEM AND SYSTEM USING SUCH A DEVICE AND/OR CONTROL METHOD

(71) Applicant: FIMCIM S.p.A., Milan (IT)

(72) Inventors: Roberto Cimberio, Ameno Fraz. Vacciago (IT); Tiziano Guidetti, Borgomanero (IT); Matteo Zanchi, Arcore (IT); Silvia Garone, Como (IT); Antoine Frein, Milan (IT)

(73) Assignee: FIMCIM S.P.A., Milan (IT)

( * ) Notice: Subject to any disclaimer, the term of this patent is extended or adjusted under 35 U.S.C. 154(b) by 135 days.

(21) Appl. No.: 16/565,745

(22) Filed: Sep. 10, 2019

(65) Prior Publication Data

US 2020/0080743 A1     Mar. 12, 2020

(30) Foreign Application Priority Data

Sep. 12, 2018 (IT) .......................... 102018000008530

(51) Int. Cl.
*F24F 11/46* (2018.01)
*F24F 3/06* (2006.01)
(Continued)

(52) U.S. Cl.
CPC ................ *F24F 11/46* (2018.01); *F24F 3/06* (2013.01); *F24F 11/65* (2018.01); *F24F 11/84* (2018.01); *F24F 11/85* (2018.01); *G05B 13/042* (2013.01)

(58) Field of Classification Search
CPC .... F24F 11/46; F24F 3/06; F24F 11/84; F24F 11/85; F24F 11/65; F24F 2110/10;
(Continued)

(56) References Cited

U.S. PATENT DOCUMENTS

| | | | |
|---|---|---|---|
| 2017/0028813 A1* | 2/2017 | Enomoto | ................. B60H 1/24 |
| 2017/0067656 A1* | 3/2017 | Guidetti | ............. F24D 19/1015 |
| 2017/0067662 A1* | 3/2017 | Guidetti | ................ F16K 31/042 |

FOREIGN PATENT DOCUMENTS

| | | | |
|---|---|---|---|
| DE | 10 2012 109 483 | 6/2014 | |
| EP | 0066553 A1 * | 12/1982 | ......... G05D 23/1934 |

(Continued)

OTHER PUBLICATIONS

Early Search Report for IT Patent Application No. 2018000008530 dated Jun. 4, 2019, 9 pages.

*Primary Examiner* — Michael D Masinick
(74) *Attorney, Agent, or Firm* — Nixon & Vanderhye P.C.

(57) ABSTRACT

A method to control a carrier fluid through a service line (5) of a conditioning and/or heating system (1). The service line includes a heat exchange unit (7), a flow regulator (8), temperature sensors (9; 9a, 9b) detecting a temperature difference ($\Delta T_i$) between the carrier fluid in a first section (5a) of the service line (5) upstream of said heat exchange unit (7) and carrier fluid in a second section (5b) of the service line (5) downstream of the same heat exchange unit (7). The method includes calculating a value assumed by a control parameter (Pc) which is a function of at least one or more values assumed by the temperature difference in the transition of the flow regulator from a first to a second operating condition, for then determining whether the value of the control parameter (Pc) is higher than a threshold (S).

33 Claims, 6 Drawing Sheets

(51) Int. Cl.
*G05B 13/04* (2006.01)
*F24F 11/84* (2018.01)
*F24F 11/85* (2018.01)
*F24F 11/65* (2018.01)

(58) Field of Classification Search
CPC ......... F24F 11/83; F24F 11/64; G05B 13/042; Y02B 30/70; F24D 19/1015; F24D 19/1012; G05D 23/1934
See application file for complete search history.

(56) References Cited

FOREIGN PATENT DOCUMENTS

| | | |
|---|---|---|
| EP | 2 307 938 | 4/2011 |
| EP | 2 641 027 | 9/2013 |
| EP | 2 706 425 | 3/2014 |
| EP | 2 753 999 | 7/2014 |
| EP | 2 896 899 | 7/2015 |
| EP | 2 936 003 | 10/2015 |
| EP | 3 141 823 | 3/2017 |
| WO | 2010/074921 | 7/2010 |
| WO | 2012/065275 | 5/2012 |
| WO | 2013/078570 | 6/2013 |
| WO | 2014/131485 | 9/2014 |
| WO | 2014/151579 | 9/2014 |
| WO | 2014/183868 | 11/2014 |
| WO | 2015/090517 | 6/2015 |
| WO | 2016/074873 | 5/2016 |
| WO | 2016/156556 | 10/2016 |

\* cited by examiner

METHOD AND DEVICE FOR CONTROLLING THE FLOW OF FLUID IN AN AIR-CONDITIONING AND/OR HEATING SYSTEM AND SYSTEM USING SUCH A DEVICE AND/OR CONTROL METHOD

RELATED APPLICATION

This application claims priority to Italian Patent Application No. 102018000008530 filed Sep. 12, 2018, the entirety of which is incorporated by reference.

FIELD OF THE INVENTION

The present invention relates to a process and a corresponding device for controlling the flow rate of a fluid (for example a liquid such as water or a cooling fluid used as a carrier fluid) in a branch of an air conditioning and/or heating system. The invention also relates to an air conditioning and/or heating system using the method and the control device according to the invention. The invention may be used both in civil and in industrial environments and may be advantageously exploited for the control and optimization at an energy level of air conditioning and/or heating systems.

BACKGROUND

As is known, heating and/or conditioning systems are increasingly used to keep the rooms, such as rooms of units for residential or work use, at the desired temperature and/or humidity conditions.

Such systems are generally supplied by a central unit comprising a heating unit (such as a boiler, a heat pump or other) and/or a refrigerating unit; the central unit sends in a suitable distribution circuit a carrier fluid having desired properties in terms of temperature, flow rate and specific heat. In the room to be air-conditioned there are then one or more heat treatment units (for example a fan or fan coil) coupled with a portion of the distribution circuit and capable of transferring heat or respectively cold from the carrier fluid circulating in the distribution circuit to the room to be served.

The control and optimization of air conditioning and/or heating systems are rather complex tasks, particularly when there are numerous rooms served by the same system: consider in this regard systems for offices, hotels or in general buildings in which there are numerous distinct rooms where therefore the carrier fluid must be conveyed in the optimal conditions of temperature and flow rate in order to guarantee an efficient heat exchange without requiring excessive flow rates.

It is evident that the efficiency of the energy exchange in each room influences the efficiency of the system as a whole and therefore impacts on the overall management costs. Furthermore, within a large system, it is important to avoid, to the extent possible, that the flow in the various branches of the system reaches unnecessarily high values that would introduce inefficiency due to the related load losses.

The known technical solutions have often been found to be inadequate in controlling the carrier fluid flowing through each heat exchanger, forcing the system to work as a whole in less than optimal conditions.

In particular, the flow rates of the carrier fluid in the known solutions have often proved to be unnecessarily excessive, with consequent unnecessary energy waste.

SUMMARY OF THE INVENTION

The invention disclosed herein may be embodied to solve at least one of the drawbacks and/or limitations of the above solutions.

In particular, the invention may be embodied to control the fluid passing through one or more heat exchangers present in an air conditioning/heating system in order to optimize the energy exchange avoiding low efficiency operating conditions.

The invention may be embodied to provide a control device and process for conditioning and/or heating systems capable of optimally regulating the carrier fluid passing through the exchangers.

In particular, the invention may be embodied to provide a control device and process which allow finding a compromise between the need to increase the flow rate through an exchanger to increase the heat exchange and the presence of excessive flow rates which would give rise to significant load losses.

The invention may also be embodied to provide a conditioning and/or heating system which enables energy management to be improved in a system intended to serve a plurality of distinct rooms.

Furthermore, the invention may be embodied to provide a solution capable of performing a real-time optimization in the various branches of a system.

Aspects of the invention are described below.

A $1^{st}$ aspect concerns a process of controlling a flow of a carrier fluid through a service line (5) of a conditioning and/or heating system (1), said service line comprising:
at least one heat exchange unit (7),
at least one flow regulator (8) configured to control the flow of carrier fluid passing through the heat exchange unit (7), and
at least one temperature sensor (9; 9a, 9b) configured to emit at least one temperature signal related to a temperature difference ($\Delta T_i$) (or in any case configured for allowing determination of the temperature difference $\Delta T_i$) between the carrier fluid in a first section (5a) of the service line (5) upstream of said heat exchange unit (7) and carrier fluid in a second section (5b) of the same service line (5) downstream of the same heat exchange unit (7);

said control process comprising the following steps:
a) positioning the flow regulator in a first operating condition to which the following corresponds
a first value ($\varphi_1$; $\Delta p_1$) of a flow parameter ($\varphi$; $\Delta p$) relative to the flow of carrier fluid passing through the heat exchanger, and
a first value ($\Delta T_1$) of said temperature difference,
b) positioning the flow regulator in a second operating condition to which the following corresponds
an increase in the value of the flow parameter ($\varphi$; $\Delta p$) from said first value ($\varphi_1$; $\Delta p_1$) to a second value ($\varphi_2$; $\Delta p_2$) higher than the first value ($\varphi_1$; $\Delta p_1$) and
a second value ($\Delta T_2$) of said temperature difference,
c) calculating a value assumed by a control parameter (Pc) which is a function of at least one or more values assumed by said temperature difference in the transition of the flow regulator from said first to said second operating condition,
d) comparing said value of the control parameter (Pc) with a minimum threshold (S) to determine whether the value of the control parameter (Pc) is higher or not than said minimum threshold (S).

Note, that in accordance with an option, the temperature sensor may be a differential temperature sensor (9) emitting a signal directly linked to said temperature difference ($\Delta T_i$) or the temperature sensor may include a first and a second temperature sensors (9a, 9b) respectively configured for detecting a temperature of the carrier fluid in said first section (5a) and a temperature of the fluid in said second section (5b) and emit a corresponding temperature signal related to the temperature difference in the sense that each temperature signal allows determining the temperature in the respective the first and second sections and thus the temperature difference.

In a $2^{nd}$ aspect according to the preceding aspect the process comprises the following additional steps:

if following step d) of comparing said value of the control parameter (Pc) with the minimum threshold (S) it is determined that the value of the control parameter is higher than said minimum threshold, the control process provides then to execute the following cycle e) positioning the flow regulator from the second operating condition (or previous operating condition, if the cycle is repeated more than once) in a subsequent operating condition to which the following corresponds an increase in the value of the flow parameter ($\varphi$; $\Delta p$) from said second value ($\varphi_2$; $\Delta p_2$) (or from a previous value ($\varphi_i$; $\Delta p_i$) if the cycle is repeated more than once) to a subsequent value ($\varphi_{i+1}$; $\Delta p_{i+1}$) higher than the second value (or respectively higher than the previous value ($\varphi_i$; $\Delta p_i$));

a variation from the second value ($\Delta T_2$) (or previous value ($\Delta T_i$)) to a subsequent value ($\Delta T_{i+1}$) of said temperature difference, f) calculating a further value assumed by the control parameter (Pc) which is a function of at least one or more values assumed by said temperature difference in the transition of the flow regulator from the second operating condition (or previous operating condition) to said subsequent operating condition, g) comparing said further value of the control parameter (Pc) with the minimum threshold (S) to determine whether or not the further value of the control parameter is higher than said minimum threshold.

In accordance with a $3^{rd}$ aspect according to the preceding aspect the process provides for repeating steps e) to g) if, following step g), it is determined that the value of the control parameter is higher than said minimum threshold. In practice steps e) to g) of the cycle are repeated until at step g) it is determined that the value reached by the control parameter (Pc) becomes equal or smaller than the minimum threshold (S).

At each repetition of the cycle the cyclic steps e) to g) are as follows:

e) the flow regulator is positioned from the operating condition reached in the last executed cycle (or previous operating position) to a further operating condition (or subsequent operating condition) to which the following corresponds an increase in the value of the flow parameter ($\varphi$; $\Delta p$) from the value reached in last executed cycle ($\varphi_{i+1}$; $\Delta \varphi_{i+1}$), or previous value of the flow parameter, to a further and higher value ($\varphi_{i+2}$; $\Delta \varphi_{i+2}$) of the same flow parameter;

a variation of said temperature difference from the value reached in the last executed cycle ($\Delta T_{i+1}$), or previous value of the temperature difference, to a further value of said temperature difference ($\Delta T_{i+2}$);

f) calculating a new further value assumed by the control parameter (Pc) which is a function of one or more values assumed by said temperature difference in the transition of the flow regulator from the previous operating condition to the further operating condition, g) comparing said new further value of the control parameter (Pc) with the minimum threshold (S) to determine whether or not the further value of the control parameter is higher than said minimum threshold;

In a $4^{th}$ aspect according to any one of the preceding two aspects the process provides for:

if following said step d) or said step g) it is instead determined that the value of the control parameter (Pc) is less than or equal to said minimum threshold (S), then not changing the operating condition of the flow regulator in the direction of a further increase in the value of the flow parameter ($\varphi$; $\Delta p$).

In a $5^{th}$ aspect according to the preceding three aspects the process provides for:

if following said step d) or said step g) it is instead determined that the value of the control parameter (Pc) is less than or equal to said minimum threshold (S), then not changing the operating condition of the flow regulator in the direction of a further increase in the value of the flow parameter ($\varphi$; $\Delta p$) and setting the last operating condition reached by the flow regulator during the cycle (i.e., the operating condition reached at step e) of the last cycle) as the optimal working position to which the flow regulator is maintained.

In a $6^{th}$ aspect according to one of the $2^{nd}$ or $3^{rd}$ or $4^{th}$ aspect the process provides for:

if following said step d) or said step g) it is instead determined that the value of the control parameter (Pc) is less than or equal to said minimum threshold (S), then not changing the operating condition of the flow regulator in the direction of a further increase in the value of the flow parameter ($\varphi$; $\Delta p$) and setting the penultimate operating condition reached by the flow regulator during the cycle (i.e., the operating condition reached at step e) of the penultimate cycle) as the optimal working position to which the flow regulator is maintained.

In a $7^{th}$ aspect according to one of the $2^{nd}$ or $3^{rd}$ or $4^{th}$ aspect the process provides for:

if following said step d) or said step g) it is instead determined that the value of the control parameter (Pc) is less than or equal to said minimum threshold (S), then changing the operating condition of the flow regulator by a prefixed step in the direction of a decrease in the value of the flow parameter ($\varphi$; $\Delta p$) and setting this latter operating condition as the optimal working position to which the flow regulator is maintained.

In a $8^{th}$ aspect according to any one of the preceding three aspects, wherein the optimal working condition is either maintained at least for a period of time (which is relatively long, for example greater than 1 hour) or until an event (such as a user input or a change in the incoming fluid temperature) generates the need to change the operating conditions of the flow regulator.

In a $9^{th}$ aspect according to any one of the preceding aspects, the step of calculating comprises calculating the value assumed by a control parameter (Pc) as a function of a plurality of values ($\Delta T_1$, $\Delta T_x$, $\Delta T_2$) assumed by said temperature difference in the transition of the flow regulator from said first to said second operating condition.

In a 10$^{th}$ aspect according to any one of the preceding aspects the value of the control parameter (Pc) is calculated as a function of the first or the previous value ($\Delta T_1$; $\Delta T_i$) of said temperature difference and of the second or subsequent value ($\Delta T_2$; $\Delta T_{i+1}$) of said temperature difference.

In an 11$^{th}$ aspect according to any one of the preceding aspects, the control parameter (Pc) is calculated as a function at least of:
the first or previous value ($\varphi_1$; $\Delta p_1$) of the flow parameter ($\varphi$; $\Delta p$),
the first or previous value ($\Delta T_1$) of said temperature difference,
the second or subsequent value ($\varphi_2$; $\Delta p_2$) of the flow parameter, and
the second or subsequent value ($\Delta T_2$) of said temperature difference.

In a 12$^{th}$ aspect according to any one of the preceding aspects, representing values of the temperature difference ($\Delta T$) vs. values of the flow parameter ($\varphi$; $\Delta p$) in a two-dimensional Cartesian system where the values of the flow parameter ($\varphi$; $\Delta p$) are reported on the abscissa and the values of the temperature difference on the ordinate ($\Delta T$), the control parameter is representative of an area under a characterizing curve or function which relates the temperature difference ($\Delta T$) with the flow parameter ($\varphi$; $\Delta p$).

In a 13$^{th}$ aspect according to any one of the preceding aspects calculating the value of the control parameter (Pc) comprises calculating an integral, between the first or previous value of the flow parameter ($\varphi_1$, $\varphi_i$; $\Delta p_1$, $\Delta p_i$) and the second or subsequent value of the flow parameter ($\varphi_2$, $\varphi_{i+1}$, $\Delta p_2$, $\Delta p_{i+1}$), of a characteristic function that correlates the temperature difference ($\Delta T$) with the flow parameter ($\varphi$; $\Delta p$).

In practice at step c) of the process, the process provides for calculating the value of the control parameter (Pc) by calculating an integral, between the first value of the flow parameter ($\varphi_1$; $\Delta p_1$) and the second value of the flow parameter ($\varphi_2$, $\Delta p_2$), of a characteristic function that correlates the temperature difference ($\Delta T$) with the flow parameter ($\varphi$; $\Delta p$).

At step f) of the first execution of the process cycle the process provides for calculating the value of the control parameter (Pc) by calculating an integral, between the second value of the flow parameter $\varphi_2$; $\Delta p_2$) and a subsequent value of the flow parameter $\varphi_{i+1}$; $\Delta p_{i+1}$), of a characteristic function that correlates the temperature ($\Delta T$) with the flow parameter ($\varphi$; $\Delta p$).

At each further repetition of the cycle (if present), the process provides for calculating the value of the control parameter (Pc) by calculating an integral, between a previous value of the flow parameter ($\varphi_{i+1}$; $\Delta p_{i+1}$) reached at the last cycle and a further subsequent value of the flow parameter ($\varphi_{i+2}$; $\Delta p_{i+2}$), of a characteristic function that correlates the temperature difference ($\Delta T$) with the flow parameter ($\varphi$; $\Delta p$).

In other words:
at said step c) calculating the value of the control parameter (Pc) comprises calculating an integral, between the first value of the flow parameter ($\varphi_1$; $\Delta p_1$) and the second value of the flow parameter ($\varphi_2$; $\Delta p_2$), of a characteristic function that correlates the temperature difference ($\Delta T$) with the flow parameter ($\varphi$; $\Delta p$);
at said step g) (of the first cycle execution) calculating the value of the control parameter (Pc) comprises calculating an integral, between the second value of the flow parameter ($\varphi_2$; $\Delta p_2$) and the subsequent value of the flow parameter ($\varphi_{i+1}$; $\Delta p_{i+1}$) of a characteristic function that correlates the temperature difference ($\Delta T$) with the flow parameter ($\varphi$; $\Delta p$);
optionally, for each subsequent execution of the cycle, at said step g) calculating the value of the control parameter (Pc) comprises calculating an integral, between a previous value of the flow parameter ($\varphi_{i+1}$; $\Delta p_{i+1}$) reached at the last execution of the cycle and a further subsequent value of the flow parameter ($\varphi_{i+2}$; $\Delta p_{i+2}$), of a characteristic function that correlates the temperature difference ($\Delta T$) with the flow parameter ($\varphi$; $\Delta p$).

In a 14$^{th}$ aspect according to any one of the preceding aspects the flow parameter is the mass flow of the carrier fluid ($\varphi$) passing through the heat exchange unit (7).

In a 15$^{th}$ aspect according to any one of the preceding two aspects the characteristic function correlates the temperature difference ($\Delta T$) with the mass flow of the carrier fluid ($\varphi$) passing through the heat exchange unit (7).

In a 16$^{th}$ aspect according to any one of the preceding three aspects calculating the value of the control parameter (Pc) includes calculating the integral, between the first or previous value of the flow parameter $\varphi_1$, $\varphi_i$) and the second or subsequent value of the flow parameter ($\varphi_2$, $\varphi_{i+1}$),
$Pc = \int_{\varphi_i}^{\varphi_{i+1}} \Delta T d\varphi$, wherein=0, 1, 2 . . .
of the characteristic function that correlates the temperature difference ($\Delta T$) with the mass flow of the carrier fluid ($\varphi$) passing through the heat exchange unit (7).

In a 17$^{th}$ aspect according to any one of aspects from the 1$^{st}$ to the 13$^{th}$ the service line (7) includes a calibrated orifice (52), inserted upstream or downstream of said flow regulator, and the flow parameter is a pressure difference ($\Delta p$) between a first pressure intake of the service line (5) upstream of the calibrated orifice (52) and a second pressure intake of the same service line (5) placed downstream of the calibrated orifice (52).

In an 18$^{th}$ aspect according to the 13$^{th}$ or 17$^{th}$ aspect, the characteristic function correlates the temperature difference ($\Delta T$) with said pressure difference ($\Delta p$).

In an 19$^{th}$ aspect according to the 13$^{th}$ or 17$^{th}$ or 18$^{th}$ aspect calculating the value of the control parameter (Pc) includes calculating the integral, between the first or previous value of the flow parameter ($\Delta p_1$, $\Delta p_i$) and the second or subsequent value of the flow parameter ($\Delta p_2$, $\Delta p_{i+1}$),
$Pc = \int_{\Delta pi}^{\Delta pi+1} \Delta T d\Delta p$, wherein i=0, 1, 2 . . .
of the characteristic function that correlates the temperature difference ($\Delta T$) with said pressure difference ($\Delta p$).

In a 20$^{th}$ aspect according to any one of aspects form the 13$^{th}$ to the preceding aspect the process comprises a step of mathematical determination of an approximating function which correlates the temperature difference ($\Delta T$) with the flow parameter ($\varphi$; $\Delta p$) and which has a trend close to said characteristic function.

In a 21$^{st}$ aspect according to the preceding aspect said approximating function is of the parametric type. For example the function may be a polynomial parametric function of the type ($\Delta T$)=A×($\varphi$; $\Delta p$)$^N$+B×($\varphi$; $\Delta p$)$^{N-1}$+ . . . W×($\varphi$; $\Delta p$)+Z, where N is an integer and A, B, . . . W, Z are coefficients determined by interpolating points defined by pairs of real values of the temperature difference and of the flow parameter. Other type of parametric functions such as a logarithmic function may be used.

In a 22$^{nd}$ aspect according to any one of the preceding two aspects, in combination with the 13$^{th}$ aspect, said integral, between the first or previous value of the flow parameter ($\varphi_1$, $\varphi_1$; $\Delta p_1$, $\Delta p_1$) and the second or subsequent value of the flow parameter ($\varphi_2$, $\varphi_{i+1}$; $\Delta p_2$, $\Delta p_{i+1}$), of the characteristic function is calculated as integral, between the first or previous value of the flow parameter ($\varphi_1$, ($\varphi_i$; $\Delta p_1$, $\Delta p_i$) and the second or subsequent value of the flow parameter ($\varphi_2$, $\varphi_{i+1}$; $\Delta p_2$, $\Delta p_{i+1}$), of said approximating function.

In a 23$^{rd}$ aspect according to the preceding aspect, said integral, between the first or previous value of the flow parameter ($\varphi_1$, $\varphi_i$; $\Delta p_1$, $\Delta p_i$) and the second or subsequent value of the flow parameter ($\varphi_2$, $\varphi_{i+1}$, $\Delta p_2$, $\Delta p_{i+1}$), is calculated as Pc=($\Delta T_{i+1} - \Delta T_i$)*($\varphi_{i+1} - \varphi_i$)/2, wherein=0, 1, 2 . . .

with the flow parameter being the mass flow of the carrier fluid ($\varphi$) passing through the heat exchange unit (7).

In a 24$^{th}$ aspect according to the 22$^{nd}$ aspect said integral, between the first or previous value of the flow parameter ($\varphi_1$, $\varphi_i$; $\Delta p_1$, $\Delta p_i$) and the second or subsequent value of the flow parameter ($\varphi_2$, $\varphi_{i+1}$, $\Delta p_{i+1}$), is Pc=($\Delta T_{i+1} - \Delta T_i$)*($\Delta p_{i+1} - \Delta p_i$)/2, wherein=0, 1, 2 . . .

with the flow parameter being the pressure difference ($\Delta p$) between a first pressure intake of the service line (5) upstream of the calibrated orifice (52) and a second pressure intake of the same service line (5) placed downstream of the calibrated orifice (52).

In a 25$^{th}$ aspect according to any one of the preceding aspects from the 1$^{st}$ to the 24$^{th}$ said minimum threshold (S) has:
an invariable predetermined value.

In a 26$^{th}$ aspect according to any one of the preceding aspects from the 1$^{st}$ to the 24$^{th}$ said minimum threshold (S) has:
a predetermined value linked to the magnitude of the increase in the value of the flow parameter ($\varphi$; $\Delta p$) from said first or previous value $\varphi_1$, $\varphi_i$; $\Delta p_1$, $\Delta p_i$) to the second or subsequent value ($\varphi_2$, $\varphi_{i+1}$; $\Delta p_2$, $\Delta p_{i+1}$).

In a 27$^{th}$ aspect according to any one of the preceding aspects from the 1$^{st}$ to the 24$^{th}$ said minimum threshold (S) has:
a value calculated as a function of the magnitude of the increase in the value of the flow parameter ($\varphi$; $\Delta p$) from said first or previous value ($\varphi_1$, $\varphi_i$; $\Delta p_1$; $\Delta p_i$) to the second or subsequent value ($\varphi_2$, $\varphi_{i+1}$; $\Delta p_2$, $\Delta p_{i+1}$).

In a 28$^{th}$ aspect according to any one of the preceding aspects from the 1$^{st}$ to the 24$^{th}$ said minimum threshold (S) has:
a value calculated as a product of:
the increase in the value of the flow parameter ($\varphi$; $\Delta p$) from said first or previous value ($\varphi_1$, $\varphi_i$; $\Delta p_1$, $\Delta p_i$) to the second or subsequent value ($\varphi_2$, $\varphi_{i+1}$; $\Delta p_2$, $\Delta p_{i+1}$), and
the first or previous value ($\Delta T_1$, $\Delta T_i$) of said temperature difference,
using one of the following formulas
S=($\Delta T_i$)*($\Delta p_{i+1} - \Delta p_i$), wherein=0, 1, 2 . . . n,
S=($\Delta T_i$)*($\varphi_{i+1} - \varphi_i$), wherein=0, 1, 2 . . . n.

In a 29$^{th}$ aspect according to any one of the preceding aspects the first or previous value ($\Delta T_1$, $\Delta T_i$) of said temperature difference is determined starting from said temperature signal or signals detected when the flow regulator is in the first or previous operating condition, and
wherein the second or subsequent value ($\Delta T_2$, $\Delta T_{i+1}$) of said temperature difference is determined starting from said temperature signal or signals detected when the flow regulator is in the second or subsequent operating condition.

In a 30$^{th}$ aspect according to any one of the preceding aspects, the process provides the following:
in said step a) of positioning the flow regulator in a first operating condition, the flow regulator is controlled until the first value ($\varphi_1$; $\Delta p_1$) of the flow parameter ($\varphi$; $\Delta p$) is reached, which is a pre-set value; and wherein in said step b) of positioning the flow regulator in a second operating condition, the flow regulator is controlled until the second value ($\varphi_2$; $\Delta p_2$) of the flow parameter ($\varphi$; $\Delta p$) is reached, which is a pre-set value.

In a 31$^{st}$ aspect according to any one of aspects from the 2$^{nd}$ to the preceding aspect, the process provides the following:
in said step e) of positioning the flow regulator in a subsequent operating condition, the flow regulator is controlled until the subsequent value ($\varphi_{i+1}$; $\Delta p_{i+1}$) of the flow parameter ($\varphi$; $\Delta p$) is reached, which is a pre-set value.

In a 32$^{nd}$ aspect according to any one of the preceding aspects the flow parameter is the mass flow of the carrier fluid ($\varphi$) passing through the heat exchange unit (7); wherein either said service line comprises a flow meter, and the flow meter is configured to measure the mass flow of a carrier fluid ($\varphi$) passing through the heat exchange unit (7), or said service line comprises a position sensor of a shut-off element present in the flow regulator, and wherein the mass flow of carrier fluid ($\varphi$) passing through the heat exchange unit (7) is calculated as a function of the position taken by the shut-off device and the pressure drop to the heads of the flow regulator;
or the service line comprises a calibrated orifice (52), inserted upstream or downstream of said flow regulator, and the mass flow of carrier fluid ($\varphi$) is calculated as a function of the pressure difference ($\Delta p$) between a first pressure intake of the service line (5) upstream of the calibrated orifice (52) and a second pressure intake of the same service line (5) located downstream of the calibrated orifice (52).

A 33$^{rd}$ aspect concerns a device for controlling a flow of carrier fluid through a service line (5) of a conditioning and/or heating system (1).

In a 34$^{th}$ aspect according to the preceding aspect the device is configured for executing the process of any one of the preceding claims. For example the device comprises appropriate sensors and at least a processing unit connected with the sensors and configured for executing the steps of the process of any one of the preceding aspects.

In a 35$^{th}$ aspects according to any one of the preceding two aspects, said service line comprises:
at least one heat exchange unit (7),
at least one flow regulator (8) configured to control the flow of carrier fluid passing through the heat exchange unit (7), and
at least one temperature sensor (9; 9a, 9b) configured to emit at least one temperature signal related to a temperature difference ($\Delta T_i$) (or in any case configured for allowing determination of the temperature difference $\Delta T_i$) between the carrier fluid in a first section (5a) of the service line (5) upstream of said heat exchange unit (7) and carrier fluid in a second section (5b) of the same service line (5) downstream of the same heat exchange unit (7);
the control device comprising at least one processing unit connected to the flow controller (8) and to the temperature sensor (9) or sensors (9a, 9b) and configured to perform the control process according to any one of the preceding claims.

In a 36$^{th}$ aspect according to the preceding aspect, the temperature sensor may be a differential temperature sensor (9) emitting a signal directly linked to said temperature difference ($\Delta T_i$), or
the temperature sensor may include a first and a second temperature sensors (9a, 9b) respectively configured for detecting a temperature of the carrier fluid in said first section (5a) and a temperature of the fluid in said second section (5b) and emit a corresponding temperature signal related to the temperature difference in the sense that each temperature signal allows determining the temperature in the respective the first and second sections and thus the temperature difference.

A 37$^{th}$ aspect concerns an air conditioning and/or heating system comprising
a carrier fluid distribution circuit (2), having:
at least one delivery line (3) of the carrier fluid,
at least one return line (4) of the carrier fluid, and
a plurality of service lines (5) connected directly or indirectly to said delivery line (3) and to said return line (4) and configured to serve respective rooms to be conditioned and/or heated, wherein each of said service lines (5) in turn comprises:
at least one heat exchange unit (7),
at least one flow regulator (8) configured to control the flow of carrier fluid passing through the heat exchange unit (7), and
at least one temperature sensor (9; 9a, 9b) configured to emit at least one temperature signal related to a temperature difference ($\Delta T_i$) (or in any case configured for allowing determination of the temperature difference $\Delta T_i$) between the carrier fluid in a first section (5a) of the service line (5) upstream of said heat exchange unit (7) and carrier fluid in a second section (5b) of the same service line (5) downstream of the same heat exchange unit (7);
at least one central heat treatment unit (6) located on the circuit (2),
at least one control device comprising a processing unit connected to the flow regulator (8) and to the temperature sensor (9) or temperature sensors (9a, 9b) of each service line and configured to perform for each service line the control process according to any one of the preceding aspects from the 1$^{st}$ to the 32$^{nd}$.

In a 38$^{th}$ aspect according to any one of the preceding process or device or system aspects, in each service line (5), the flow regulator (8) comprises:
at least one valve (16) having a valve body (16a) having at least one inlet (17), at least one outlet (18) connected by at least one passage (19) which puts the inlet (17) in fluid communication with the outlet (18), and at least one shut-off element (20) operating in said passage (19),
said shut-off element (20) defining, in cooperation with the valve body (16a), a fluid passage gap (21) of variable width as a function of positions assumed by the shut-off element (20) with respect to the valve body (16a).

In a 39$^{th}$ aspect according to any one of the preceding process or device or system aspects the temperature sensor (9) comprises:
a first thermal detector configured to detect the temperature in a first section (5a) of each channel (5) upstream of said heat exchange unit (7) and a second thermal detector configured to detect the temperature in a second section (5b) of each channel (5) downstream of the same heat exchange unit (7), or
a differential temperature sensor connected to the first section (5a) of each channel (5) upstream of said heat exchange unit (7) and to the second section (5b) of each channel (5) downstream of the same heat exchange unit (7) and configured to detect the temperature difference between said first and said second section (5a, 5b) of each channel (5).

In a 40$^{th}$ aspect according to any one of the preceding process or device or system aspects at least one hydraulic sensor (10) is provided comprising at least one of:
a flowmeter configured to detect the mass flow of carrier fluid ($\varphi$) passing through the heat exchange unit (7), or
a differential pressure sensor configured to detect a pressure difference between a first section of the line (5) upstream of a calibrated orifice (52) and a second section of the same channel (5) located downstream of the calibrated orifice (52), the calibrated orifice being preferably upstream of the flow regulator, or
two separate pressure sensors configured to allow a pressure difference to be calculated between a first section of the line (5) upstream of a calibrated orifice and a second section of the line (5) downstream of the calibrated orifice, the calibrated orifice being preferably upstream of the flow regulator.

In a 41$^{st}$ aspect according to any one of the preceding process or device or system aspects a position sensor (22) is provided, configured to determine the positions assumed by the shut-off element (20) of the flow regulator, along a predetermined operating stroke, with respect to the valve body (16a) of the same flow regulator, and to transmit a respective signal, in particular wherein the shut-off element (20) is configured to assume a plurality of positions along said operating stroke corresponding to different opening degrees of said passage gap (21) and wherein said position sensor (22), for example an encoder or a potentiometer, is configured to emit a signal at each step of predetermined extent performed by the shut-off element (20) along the operating stroke.

In a 42$^{nd}$ aspect according to any one of the preceding process or device or system aspects the flow rate regulator (8), the temperature sensor (9) or sensors (9a, 9b), the hydraulic sensor (10) and the position sensor (22), if present, are communicatively connected to the processing unit.

A 43$^{rd}$ aspect concerns an air conditioning and/or heating system comprising according to any one of aspects from the 37$^{th}$ to the preceding aspect, wherein the central heat treatment unit (6) comprises:
at least one main pump (12), and
at least one central unit (13) selected from a heating unit and a refrigerating unit,
and wherein the processing unit is also connected to the main pump and to the central unit and is configured to perform one or more of the following steps:
controlling the pump (12) to vary the rate at the head of the central group;
controlling the pump (12) to keep the overall flow of the carrier fluid unchanged;
controlling the heating unit to vary the temperature of the carrier fluid in the delivery line;
controlling the refrigerating unit to vary the temperature of the carrier fluid in the delivery line.

BRIEF DESCRIPTION OF THE DRAWINGS

Some embodiments and some aspects of the invention are described hereinafter with reference to the accompanying drawings, provided only for illustrative and, therefore, non-limiting purposes, in which.

DEFINITIONS AND MATERIALS

Figure 1:
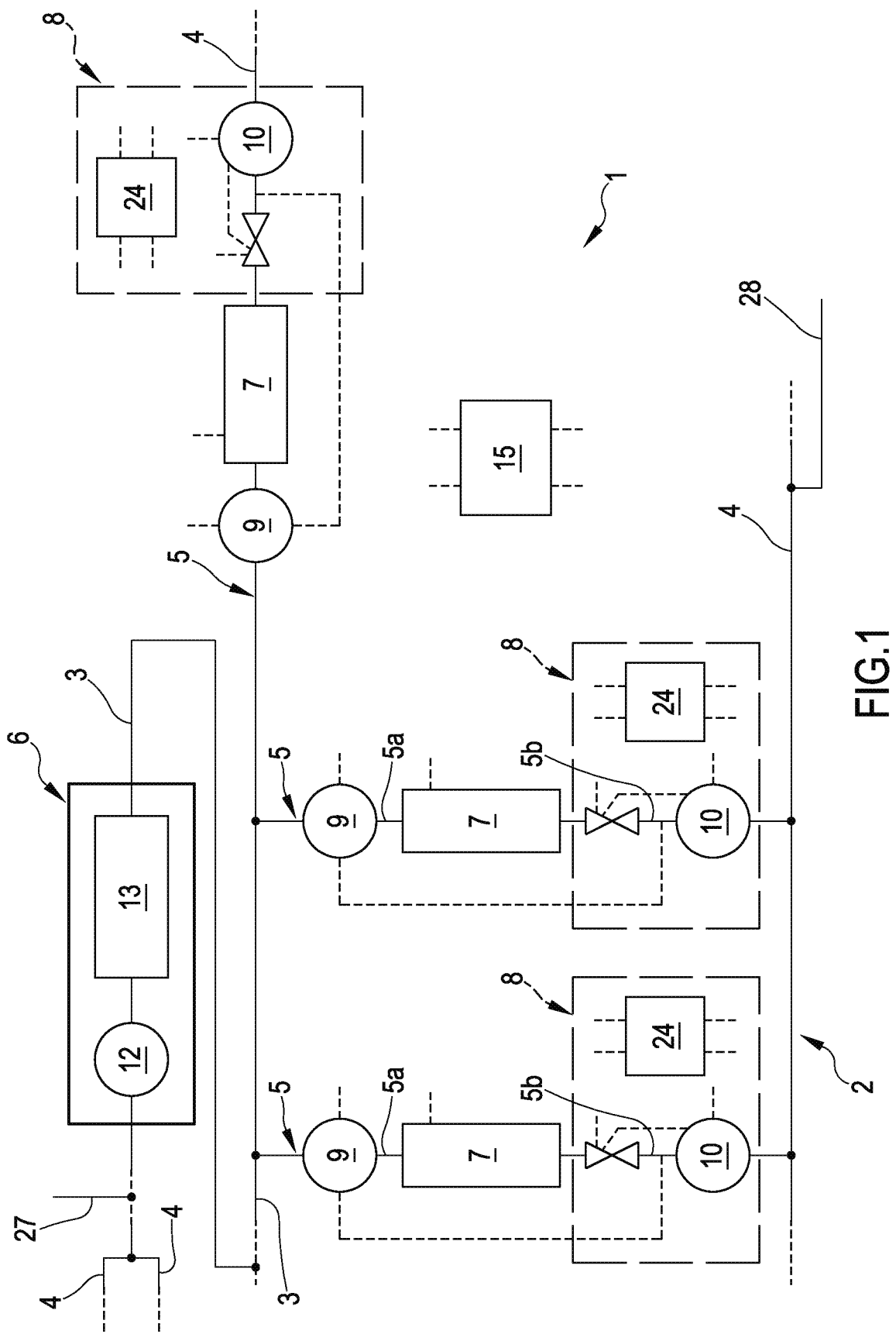
FIG. 1 is a non-limiting diagram of a conditioning and/or heating system according to the present invention.

The figures may illustrate the invention or parts thereof by representations that are not in scale; therefore, parts and components illustrated in the figures relating to the invention may relate solely to schematic representations.

The term carrier or heat carrier fluid means a substance in the liquid or gaseous state capable of receiving, accumulating, transporting and transferring heat. For example, in a heating system it is possible to use water as the carrier fluid, in particular hot water, or mixtures of hot water and glycol.

In an air conditioning system it is instead possible to use natural (e.g. ammonia and carbon dioxide) or artificial refrigerating fluids or cold water or mixtures of water and glycol or other antifreeze substances as carrier fluid.

The term central heat treatment unit (indicated with reference numeral 6 in the drawings) means a unit comprising a heating unit 13 (for example a boiler unit, or a heat pump, or a solar panel system or other heating device) configured for heating a liquid and for distributing hot liquid to suitable heat treatment units or utilities that exploit the heat for the treatment of a room. The central heat treatment unit may also, or alternatively, comprise a refrigerating unit (also indicated with reference numeral 13) configured for the treatment (cooling) of a heat carrier fluid and for distributing it to suitable heat treatment units such as indoor air conditioning units. The central heat treatment unit further comprises at least one pump indicated with reference numeral 12 in the accompanying drawings.

DETAILED DESCRIPTION

Air Conditioning and/or Heating System

With reference to the accompanying figures, a conditioning and/or heating system has been indicated as a whole with reference numeral 1.

As may be seen, for example, in FIG. 1, the system 1 comprises a circuit 2 for distributing a carrier fluid. The circuit 2 has at least two main channels namely: a delivery line 3, for sending the carrier fluid to a predetermined number of utilities or heat exchange units 7, and a return line 4 in fluid connection with the delivery line 3 and arranged to receive the carrier fluid downstream of each of the units 7. As may be seen in FIG. 1, the distribution circuit 2 comprises a plurality of circulation channels or service lines 5 directly or indirectly connected to the delivery line 3 and to the return line 4 and configured to serve respective rooms to be conditioned and/or heated. Each service line 5 is configured to supply at least one respective heat exchange unit 7.

FIG. 1 illustrates a preferential but not limiting configuration of the invention, in which each service line 5 is interposed between the delivery line 3 and the return line 4 and serves a respective heat exchange unit 7. In this configuration, the lines 5 are arranged in parallel with each other and receive fluid from the delivery line and then return it to the return line after the passage of the fluid from the respective unit 7. In this configuration, it is possible to send to each unit only one type of fluid. For example, if the central unit 6 comprises a heating (or cooling) unit 13, each of the channels 5 receives heated (or respectively cooled) fluid from the central unit 6 and discharges to the return line fluid that has cooled (or respectively heated) following passing through the respective unit 7. The possibility of having two or more delivery lines 3 is not excluded. For example a delivery line conveying refrigerating fluid coming from a refrigerating unit 13 of the unit 6 and a delivery line 3' coming from a heating unit 13 of the unit 6. In this case, it is possible to selectively connect one or the other of the delivery lines to each of the heat treatment units. In practice, there may be more than two delivery lines and more than two return lines if the units 7 are configured to receive fluids of different nature simultaneously or sequentially. Moreover, the possibility of arranging one or more service lines 5 in series with each other is not excluded.

FIG. 1 also shows a non-limiting configuration of the invention in which each return line 4 is directly in fluid communication with the delivery line 3 to define a closed-circuit type carrier fluid distribution circuit 2 in which the carrier fluid (or the different carrier fluids, if more discharge lines and more return lines are used) is recirculated within the distribution circuit 2.

The system 1 (FIG. 1) may be provided with a supply line 27, in fluid communication with the delivery 3 and/or return 4 line, and configured to allow the addition of carrier fluid in the circuit 2. An outlet line 28, in fluid communication with the delivery line 3 and/or with the return line 4, may be configured to allow the discharge of carrier fluid from the circuit 2. On each of said supply and outlet lines 27, 28 a closing valve may be advantageously arranged such as a ball valve or a simple "open and close" tap, configured to open and close the lines 27 and 28 and therefore allow the introduction of fresh carrier fluid or the discharge of carrier fluid used by the circuit 2.

As may be seen in FIG. 1, the system 1 provides at least one central heat treatment unit 6, comprising at least one pump 12 and at least one refrigerating or heating unit 13. The central unit 6 is placed on the delivery line 3 of the circuit 2 and configured to vary at least one of temperature and flow rate of the carrier fluid in the delivery line 3. The heat treatment unit 6 is placed between the delivery line(s) 3 and the return line(s) 4 so as to feed the delivery line or lines and receive the return fluid coming from the return lines. The pump 12 is configured to impose a head on the carrier fluid and therefore promote the delivery of the carrier fluid to the delivery line(s) and therefore to the service lines 5. FIG. 1 schematically shows a configuration of the system 1 having a single central heat treatment unit 6. A plurality of units 6 may be arranged in series or parallel on the delivery line 3 or directly active on a service line 5 (conditions not shown in the accompanying figures).

As briefly mentioned above, the circuit 2 comprises a plurality of service lines 5; for each service line 5, the system 1 comprises at least one exchange unit 7 configured to serve a respective room to be conditioned and/or heated. Each heat exchange unit 7 (utility) may comprise at least one of:

a fan coil or air heater having at least one fan as heat exchange modulator 7a;

an ATU (air treatment unit) with at least one fan as heat exchange modulator 7a;

a radiator and/or convector as a heat exchange modulator 7a;

a heat exchanger, possibly with an adjustable heat exchange surface, as a heat exchange modulator 7a.

As shown for example in FIGS. 1-4, each service line has at least one flow regulator 8 configured to manage the quantity of carrier fluid (mass flow) passing through the respective service line 5. With reference to the direction of circulation of the fluid (see arrows F in FIGS. 2-4), the flow regulator 8 may be arranged on the service line 5 downstream of the heat exchange unit 7 operating on the same service line 5.

In greater detail, the flow regulator 8 comprises a valve 16 having a valve body 16a having at least one inlet 17, an outlet 18 and a passage 19 which places the inlet 17 in fluid communication with the outlet 18. The valve body 16a has, at the inlet 17 and at the outlet 18 of the valve 16, respective connecting members 29, 30 (FIG. 5) suitable for allowing the valve 16 to be fixed on the circuit 2. The connecting members 29, 30 may be, for example, threads or rapid connections or other types of connections.

Figure 5:
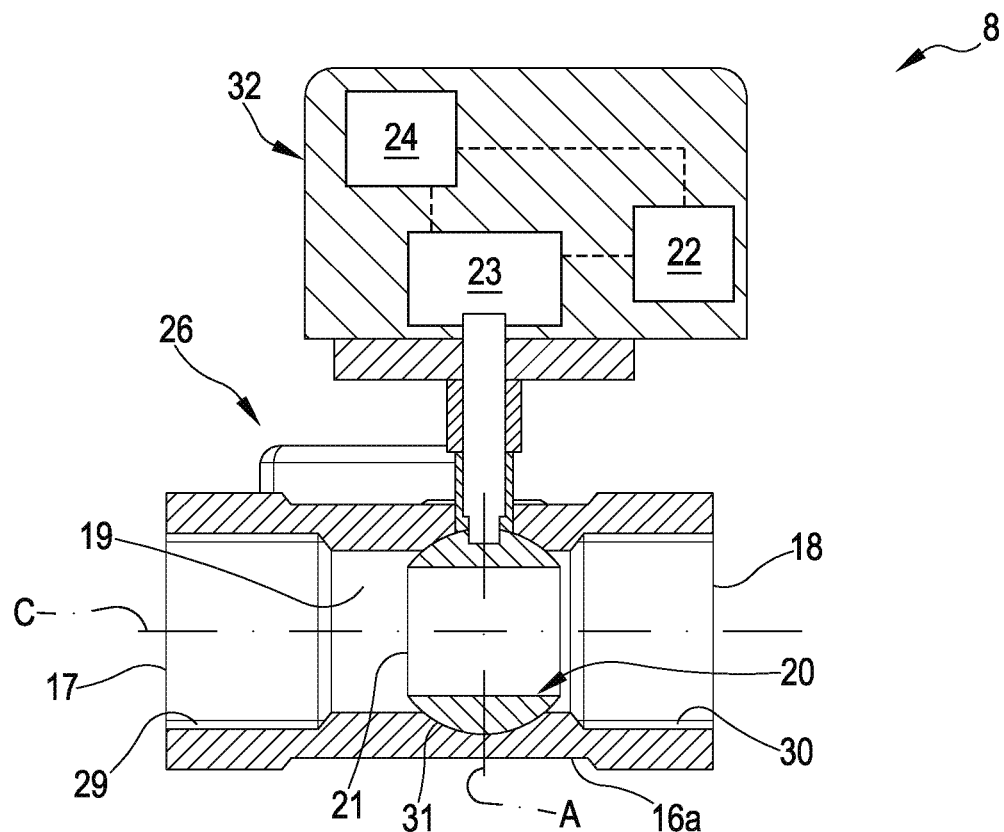
FIG. 5 is a sectional view of a valve that may be used as a flow regulator in a service line of a conditioning and/or heating system according to the present invention.

The passage 19 has a seat 31 adapted to house a shut-off element 20 which has the task of partially or totally intercepting the fluid passing through the valve and is therefore capable of acting as a flow regulator or even as a closing element of the passage 19; the shut-off element, in cooperation with the valve body 16a, defines a fluid passage gap 21 of variable width depending on the positions assumed by the shut-off element 20 with respect to the valve body 16a. The shut-off element 20 is configured to act along a predetermined operating stroke which comprises a predetermined number of operating positions, which are distinct and angularly or translatively offset from each other. The movement of the shut-off element 20 may therefore be rotary or translational. In the first case, the movement takes place by rotation according to a movement angle about a rotation axis A which extends transversely with respect to a prevalent development axis C of the channel 19 (FIG. 5). In the second case, the movement may take place in a straight direction (configuration not shown). Considering the case in which the shut-off element 20 performs a rotary movement, in order to be able to perform a rotary-type movement, the shut-off element 20 must have an outer surface of substantially spherical or cylindrical geometry, as may be seen in FIG. 5.

The valve 16 also comprises an actuator member 23 connected with the valve body 16a and active on the shut-off element 20 to move the latter at least between a complete opening position, in which the passage gap 21 has maximum area, and a closing position, in which the passage gap 21 is closed. The actuator may furthermore position the shut-off element in a plurality of intermediate positions between the open and closed position, thus allowing the flow rate through the service line 5 to be adjusted. In greater detail, the actuator member 23 may comprise an electric or mechanical motor carried by the valve body 16a and engaged with the shut-off element 20.

The flow regulator 8 may also comprise at least one position sensor 22 configured to determine the positions assumed by the shut-off element 20, along a predetermined operating stroke relative to the valve body 16a, and transmit a respective signal. In a non-limiting embodiment of the invention, the shut-off element 20 is configured to assume a plurality of positions along said operating stroke corresponding to different opening degrees of said passage gap 21: the position sensor 22 may for example comprising an encoder, a potentiometer, or other configured to emit a signal which allows determining the position of the shut-off element along the operating stroke. For example, the position sensor 22 may be configured to emit a signal at each step of a predetermined extent made by the shut-off element 20 along the operating stroke, or to emit a signal of amplitude or frequency that is a function of the position of the shut-off element along the operating stroke.

In a non-limiting embodiment of the invention, the flow regulator 8 further comprises a control unit 24 connected to the position sensor 22 and active on the actuator member 23. The control unit 24 is configured to receive the signal from the position sensor 22, process said signal to establish the relative position of the shut-off element 20 with respect to the valve body 16a. The control unit 24 may also be configured to control the actuator 23, in particular to move the shut-off element 20 in a controlled manner The connection by means of the control unit 24 to the sensor 22 and to the actuator member 23 allows the unit 24 to manage and control the movement of the shut-off element 20. In practice, the control unit 24 may comprise one or more microprocessors programmed to receive in input the signal from the sensor 22, thus establishing therefrom the actual position of each shut-off element and acting on the actuator member 23 as a function of such a signal and of the desired position to which the shut-off element 20 is to be brought.

The actuator member 23 and the control unit 24 may be part of the valve 16 operating downstream of each heat treatment unit 7 of the same service line 5 on which said valve 16 is active. In fact, in the example of FIG. 5, sensor 22, actuator member 23 and control unit 24 define a sort of control head 32 carried stably by the valve body 16a which is adapted to monitor and control the shut-off element 20.

As may be seen in FIG. 1, the system 1 may comprise various sensors.

For example, for each service line 5, at least one temperature sensor 9 may be configured to detect a measured value of a thermal parameter dependent on the temperature difference between a first section 5a of a service line 5 upstream of said heat exchange unit 7 and a second section 5b of the same service line 5 downstream of the heat exchange unit 7. FIG. 1 illustrates a first configuration of the temperature sensor 9 comprising essentially a single differential sensor connected with the first section 5a of a service line 5 upstream of the heat exchange unit 7 and with the second section 5b of the same line of service 5 downstream of the same heat exchange unit 7: the differential sensor is configured to detect the temperature difference between said first and said second section 5a, 5b of each service line 5. The differential sensor 9 may be physically positioned upstream of the exchange unit 7 as shown in FIG. 1 and have a detection line in fluid communication on the service line 5 downstream of the heat exchange unit 7. Alternatively, the sensor 9 may be carried by the flow regulator 8, downstream of the unit 7, and have a detection line in fluid communication with a point of the service line 5 upstream of the same unit 7.

Figure 2:
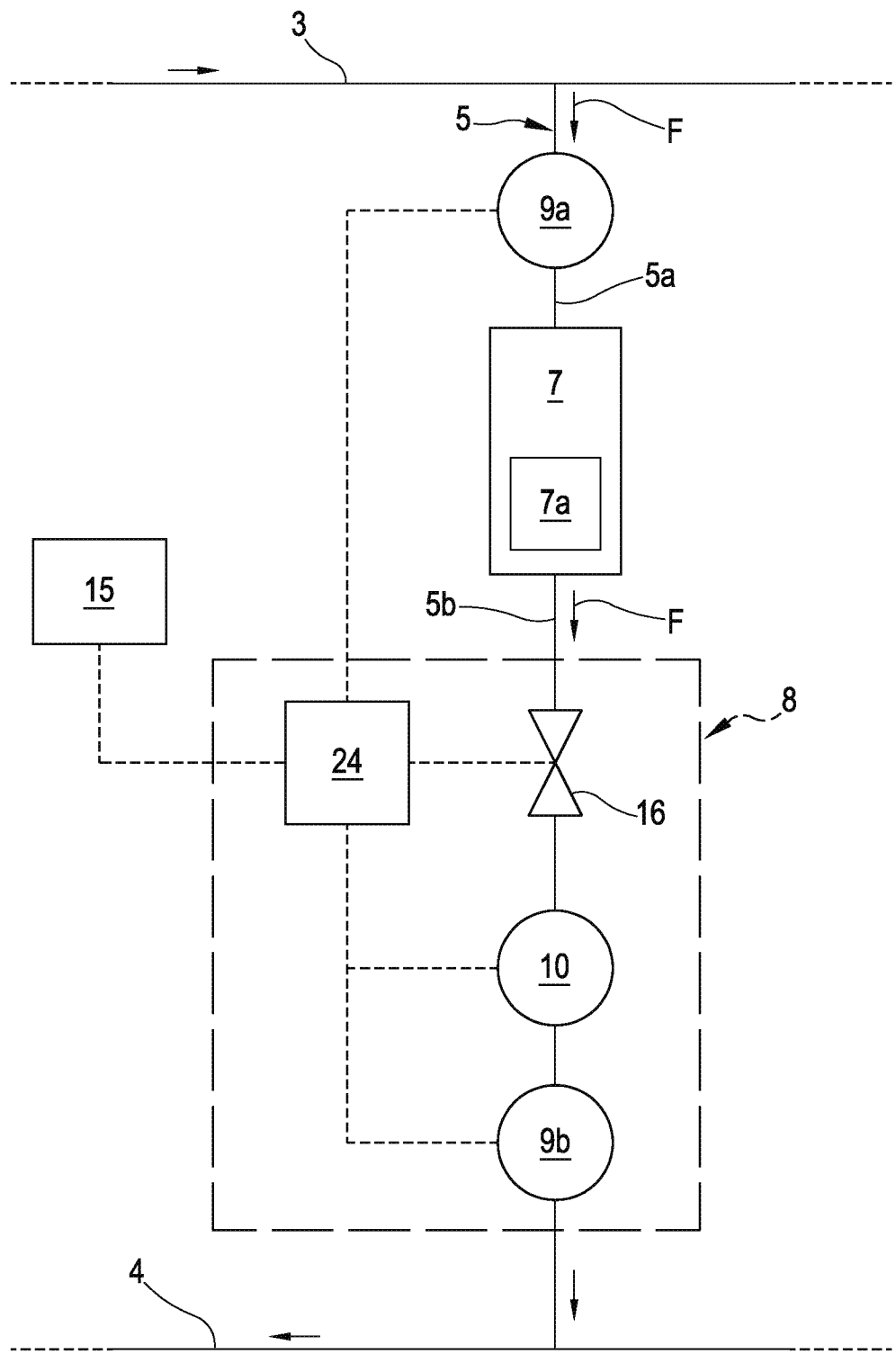
FIGS. 2 to 4 are respective schematic representations of embodiments of a service line of a system according to the present invention.
Figure 3:
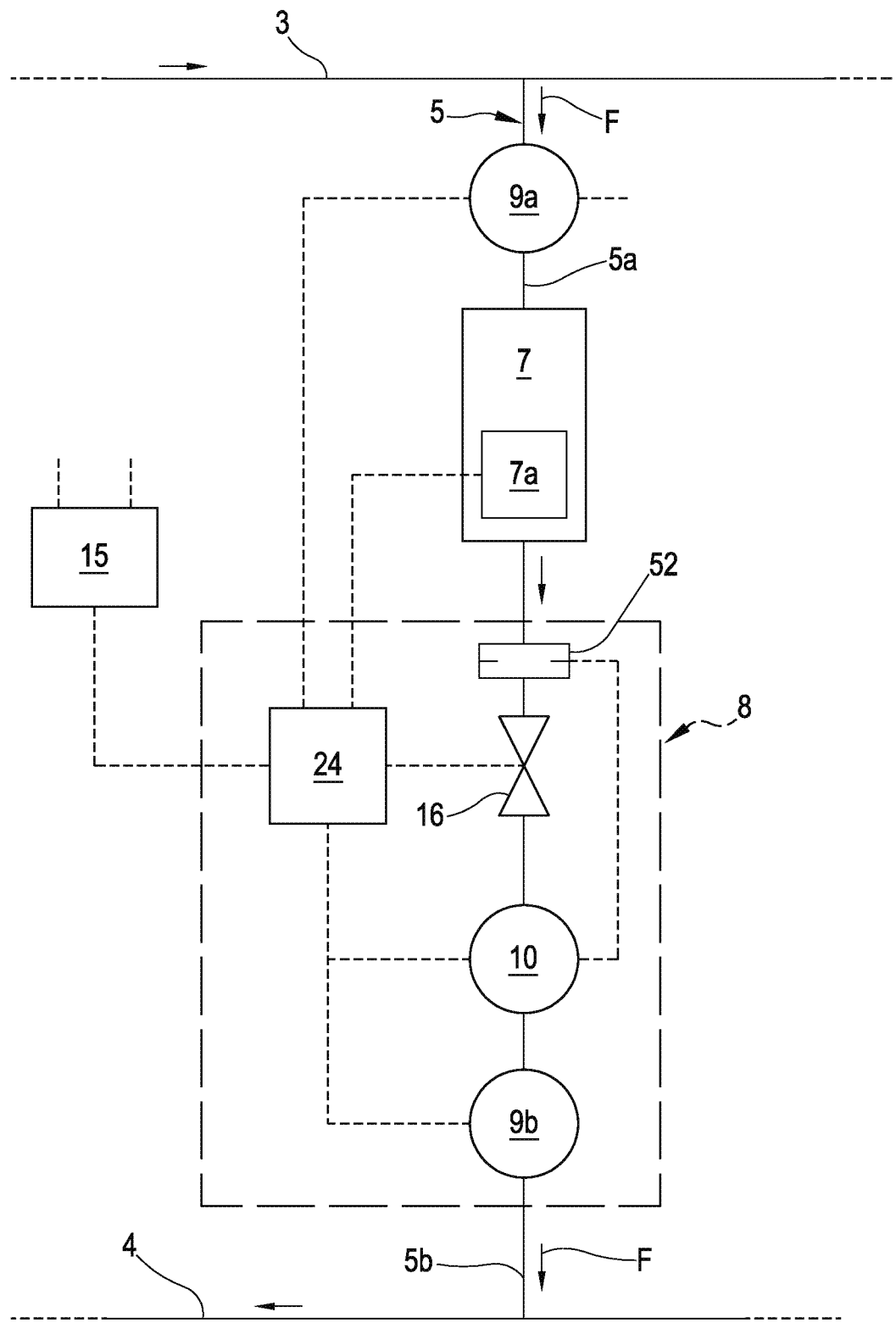

FIG. 2 instead illustrates a second embodiment in which the temperature sensor 9 comprises a first thermal detector 9a configured to detect the temperature in a first section 5a of a service line 5 upstream of the heat exchange unit 7 and a second thermal detector 9b configured to detect the temperature in a second section 5b of the same service line 5 downstream of the heat exchange unit 7. In this second variant, the second detector 9*b* may be carried by the flow regulator 8 and in particular by the valve 16.

The temperature sensor 9 may be connected to the control unit 24 of the flow regulator 8 which may be configured to process the signal or signals received from said temperature sensor 9 or 9*a*, 9*b* and calculate the temperature difference between the mentioned sections (first and second sections 5*a*, 5*b*) upstream and downstream of the heat exchange unit 7.

The system 1 may also comprise, for each service line 5, at least one hydraulic sensor 10 configured to detect (or allow to determine with known formulas) the flow rate passing through each flow regulator 8. In a configuration of the system 1, the hydraulic sensor 10 may comprise a flowmeter (case shown in FIG. 2), for example carried directly by the flow regulator 8, in particular directly by the valve 16, and configured to detect the flow rate passing through the regulator 8.

Alternatively, the hydraulic sensor 10 may comprise a sensor capable of measuring a difference (or a ratio) of pressure between a first section 5*c* of a service line 5 upstream of said flow regulator 8 and a second section 5*d* of the same service line 5 downstream of the same flow regulator 8 (case shown in FIG. 4): knowing the position of the shut-off element and the characteristic curve mass flow/pressure drop of the valve 16 it is possible to obtain the flow rate from the measured value of the pressure difference. More in detail, the sensor 10 may measure for example a difference or a ratio between the actual pressure present in section 5*c* and the pressure in section 5*d*, providing an output signal proportional to the difference or ratio between the pressures in the two sections 5*c*, 5*d* mentioned. As may be seen in FIG. 4, the first section 5*c* of the service line 5 may be arranged downstream of the heat treatment unit 7. Alternatively, the first section 5*c* of the hydraulic sensor 10 may coincide with the first section 5*a* or be arranged upstream of the heat treatment unit 7). The second section 5*d* is for example located immediately downstream or on the valve 16 and directly connected with the channel 19 of the valve 16. The first and second sections 5*c* and 5*d* could both be located on the valve body of the valve 16 upstream and downstream of the shut-off element 20.

In a further alternative, the hydraulic sensor 10 may comprise a sensor capable of measuring the pressure in a section of a service line 5 immediately upstream and in a section immediately downstream of a calibrated orifice 52 (case illustrated in FIG. 3), or the differential pressure between the two points immediately upstream and downstream of the calibrated orifice 52: the calibrated orifice is preferably placed upstream of the flow regulator so as not to be subjected to interference; knowing the characteristic mass flow rate/pressure drop of the orifice it is possible to determine the mass flow rate therethrough.

In fact, the sensor 10 may in all the above described cases comprise a differential pressure sensor 26 which receives in input a first and a second pressure signal and generates an output differential signal from which it is possible to calculate the flow rate.

Alternatively, in the use of a differential sensor, it is possible to provide a configuration in which the sensor 10 comprises a first detector and a second detector in fluid connection with the respective sections as described above of the same service line 5.

The hydraulic sensor 10 may be connected to the control unit 24 of the flow regulator 8; in this case, the control unit 24 is configured to receive the signal from said hydraulic sensor 10 and calculate the mass flow rate passing therethrough. For example, the control unit 24 is configured to determine the actual mass flow rate passing through the regulator 8 on the basis of the difference between the values of the pressure parameter measured in the first and second sections 5*c* and 5*d* by the sensor 10.

Figure 4:
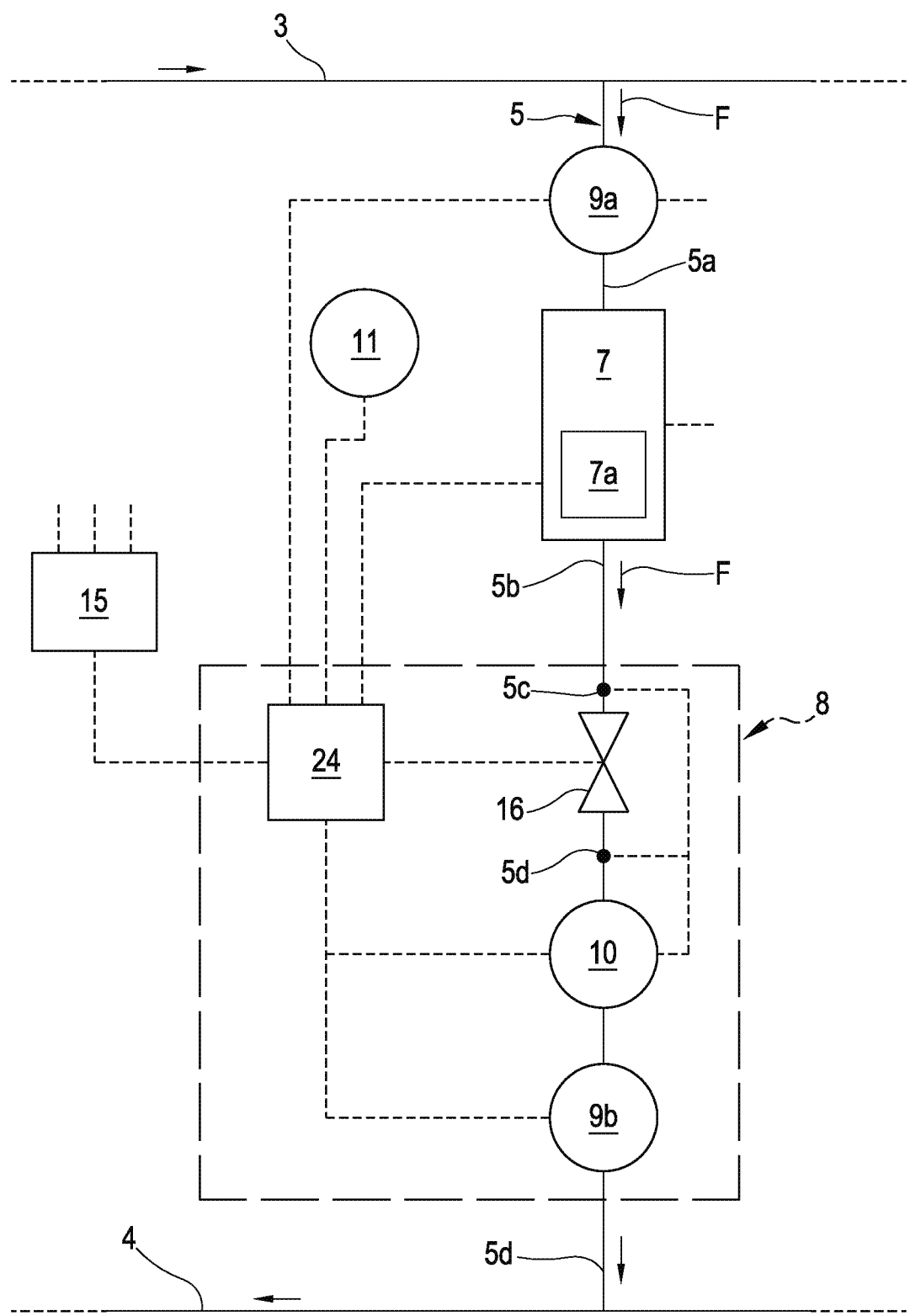

As further illustrated in FIG. 4, the system 1 may comprise a room temperature sensor 11 (see FIG. 4) intended to operate at each of the rooms served by the heat exchange units 7.

The sensor 11 may be connected to the control unit 24 of the flow regulator 8; in this case, the control unit 24 may be configured to receive the signal from the sensor 11 and calculate the temperature in the room in which the heat treatment unit 7 operates. Moreover, the temperature sensor may be connected to the control system (not shown) of the heat exchange modulator 7*a* present in each heat exchange unit so as to adjust the heat exchange modulator 7*a* according to the temperature detected by the sensor 11 and to a desired temperature in the room where the sensor 11 operates The system 1 may also comprise, for each of said lines 5, at least one partial or total closing member (configuration not shown in the accompanying figures). The closing members may be positioned at the beginning or at the end of each service line 5 respectively upstream or downstream of each element (sensors, heat treatment units, regulators) active on the same service line 5. In greater detail, each closing member may comprise an on/off valve which closes or opens the supply of each service line 5: in this way, the closing members may exclude or not a service line 5 and for example the heat treatment of a room.

As may be seen, for example, in FIG. 1, the system 1 comprises a general control device 15 connected at least with the sensors described above to each service line 5 and active on each flow regulator 8 and on said central thermal treatment unit 6.

The control device 15 is configured to receive the values of the parameters measured with the sensors described herein and to carry out the control process described and claimed. The control device 15 may in turn comprise one or more microprocessor processing units with relative memories capable of storing a code which, when executed by the microprocessor unit(s), makes the control device 15 capable of performing the control process described and/or claimed below. Alternatively, the control device 15 may comprise one or more processing units formed by analog circuitry configured to perform the control process described and/or claimed below.

Alternatively, the control process described and claimed may be performed by the control unit 24 associated with each service line 5 and for example forming part of the flow regulator 8 described above. The control unit 24 may also comprise one or more microprocessor processing units with relative memories capable of storing a code which, when executed by the microprocessor processing unit(s), makes the control unit 24 capable of performing the control process described and/or claimed below. Alternatively, the control unit 24 may comprise one or more processing units formed by analog circuitry configured to perform the control process described and/or claimed below.

Control Process

The process of controlling the carrier fluid flow rate through one of the service lines 5 of the conditioning and/or heating system 1 is described below. The process described below may be applied to one or more of the service lines 5 of the system 1. As already indicated, the control process may be performed by a processing unit of the device 15 or part of the control unit 24 carried by one or more valves 16. Alternatively, the control process may be controlled by a processing unit remote with respect to the system 1. In a further alternative, it is possible to provide that the processing unit configured to perform the control process is partially physically located in the processing unit of the device 15 and partly in the processing unit of the control unit 24 onboard the valve 16. Hereinafter, the steps of the control process that may be performed by the processing unit will be described irrespective of where the processing unit is physically located.

Figure 6:
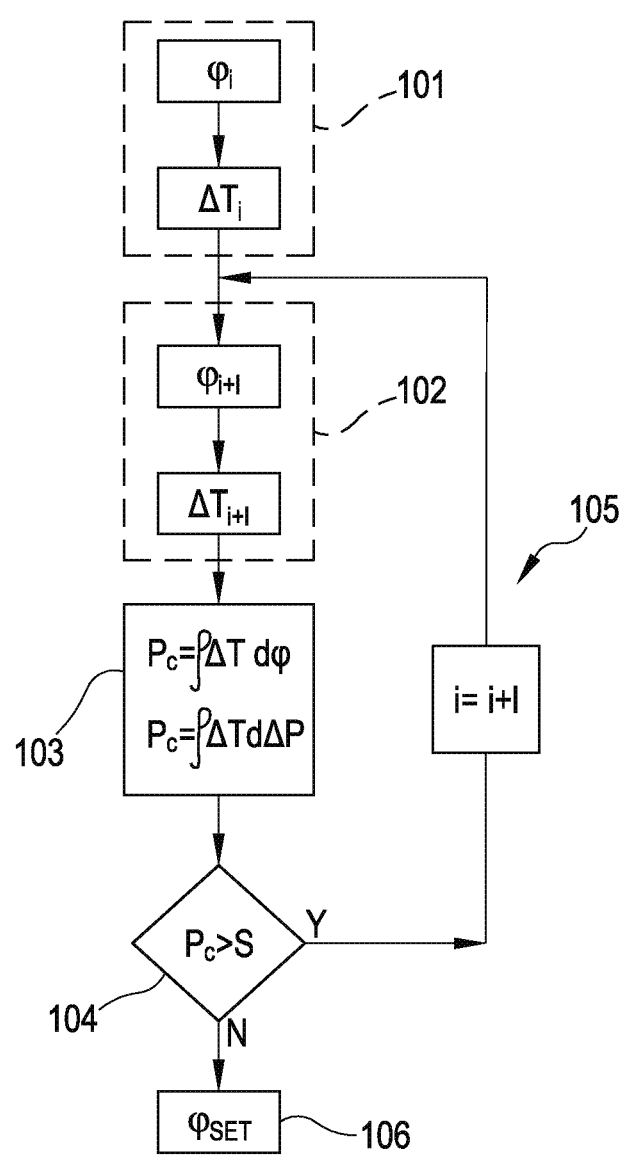
FIG. 6 is a flow chart of a control process according to the present invention.

With reference to a specific service line 5, the control process 100 comprises the following steps shown in the flow chart in FIG. 6.

In a first step 101 it is provided to position the flow regulator in a first operating condition corresponding to a first value ($\varphi_1$; $\Delta p_1$) of a flow rate parameter ($\varphi$; $\Delta p$) relative to the flow of carrier fluid passing through the heat exchanger and a first value ($\Delta T_1$) of the difference between the temperature of the carrier fluid in the first section 5a of the service line 5 upstream of the heat exchange unit 7 and the temperature of the carrier fluid in the second section 5b of the same service line 5 downstream of the heat exchange unit 7. The temperature difference is for example measured by the temperature sensor 9, as described above.

The flow rate parameter ($\varphi$) is for example the mass flow of carrier fluid passing through the heat exchange unit 7 which may be determined directly by the hydraulic sensor 10 (if the latter is a flow meter). Alternatively, the mass flow rate may be calculated by the processing unit as a function of the position assumed by the shut-off element of the valve 16 (detectable for example by an encoder) and of a characteristic curve of the valve 16 which relates the flow to the position of the shut-off element taking into account the pressure difference ($\Delta p$) at the ends of the valve, or it may be calculated by the processing unit as a function of the pressure difference ($\Delta p$) between a first pressure outlet of the service line 5 upstream of an orifice calibrated 52 (see FIG. 3) and a second pressure outlet of the same service line 5 located downstream of the calibrated orifice 52.

The flow parameter may also directly be the above pressure difference ($\Delta p$) between the first pressure intake of the service line 5 upstream of the calibrated orifice 52 (FIG. 3) and the second pressure intake of the same service line 5 placed downstream of the calibrated orifice 52.

In practice, therefore, in the first step 101, the processing unit controls the shut-off element of the flow regulator 8 to position itself in a first predetermined position or in a position which corresponds to a predetermined value of the flow rate parameter and therefore acquires the measurement from the temperature sensor of the first value ($\Delta T_1$) of the difference between the temperature of the carrier fluid in the first section 5a upstream of the heat exchange unit 7 and the temperature of the carrier fluid in the second section 5b downstream of the heat exchange unit 7.

In a second step 102 of the process, the processing unit controls the flow regulator to move to a second operating condition, for example by opening or moving by a predetermined step (or a predetermined number of steps) the shut-off element 20 or by moving the shut-off element 20 until a second predetermined value of the flow rate parameter is reached. Having reached the second operating condition, which corresponds to an increase in the value of the flow rate parameter ($\varphi$; $\Delta p$) from the first value ($\varphi_1$; $\Delta p_1$) to a second value ($\varphi_2$; $\Delta p_2$) greater than the first value ($\varphi_1$; $\Delta p_1$), the processing unit acquires the second value ($\Delta T_2$) of the temperature difference measured by the temperature sensor 9.

The processing unit then, in a third step 103, calculates the value of a control parameter Pc on the basis of one or more values assumed by the temperature difference in the passage of the flow rate regulator from the first to the second operating condition; in practice, the parameter Pc describes the trend of the temperature variation between upstream and downstream of the heat exchange unit when the flow rate passing through the same unit 7 changes.

Then, the processing unit compares (step 104) the value of the control parameter Pc as determined above with a minimum threshold S to establish whether the value of this control parameter Pc is or is not higher than the minimum threshold S. This comparison step allows determining whether, following the increase in flow through the heat exchange unit, the temperature variation between upstream and downstream of the same unit 7 has remained sufficiently high or if on the other hand it has not gained enough in terms of thermal difference.

If from the previous step of comparing the value of the control parameter Pc with the minimum threshold S it is established that the value of the control parameter is higher than the minimum threshold, the control process provides for cyclically repeating steps 102, 103 and 104 described above for increasing the flow rate, determining the value reached by the parameter Pc and comparing it with the threshold S.

In other words, a cycle 105 is provided which provides for the repetition of the following further steps, which are rerun cyclically until the value of the control parameter Pc is higher than the minimum threshold S:

repetition of step 102—the processing unit positions the flow regulator in a subsequent operating condition which corresponds to a further increase in the value of the flow rate parameter ($\varphi$; $\Delta p$) from a previous value ($\varphi_i$; $\Delta p_i$) to a subsequent value ($\varphi_{i+1}$; $\Delta p_{i+1}$) greater than the previous value ($\varphi_i$; $\Delta p_i$), and a variation of the temperature difference from a previous value ($\Delta T_i$) to a subsequent value ($\Delta T_{i+1}$); as said, cycle 105 comprises cyclically repeated steps and therefore at the first repetition the previous value is in fact the second value while the subsequent value is the third value, both as regards the flow rate parameter and the temperature difference value;

repetition of step 103—the processing unit calculates a further value assumed by the control parameter Pc as a function of one or more values assumed by said temperature difference in the transition of the flow regulator from a previous to said subsequent operating condition, repetition of step 104—the processing unit finally compares each further value of the control parameter Pc with the minimum threshold S to determine whether the value of the control parameter is higher than said minimum threshold.

If, following the cycle 105 described above, it is determined that the value of the control parameter Pc is less than or equal to the minimum threshold S, the control process provides for not changing the operating condition of the flow regulator towards a further increase in the value of the flow rate parameter ($\varphi$; $\Delta p$): in other words, thanks to the process of the invention, the line 5 is prevented from operating at excessively high flow rates, which would therefore cause significant pressure drops and hydraulic inefficiencies, if with these flow rates there is not an appreciable gain in terms of thermal variation astride of the exchanger 7.

According to a further aspect, the processing unit (step 106) sets one of the last two operating conditions reached by the flow regulator, i.e. the one which corresponds to the last or the penultimate value reached by the flow parameter ($\varphi_i$; $\varphi_{i+1}$) as the optimal working position at which to maintain the flow regulator. Since the operating condition thus reached is considered the optimal one for line 5, the position of the flow regulator 8 is then maintained alternatively by the processing unit:
  either at least for a reasonably long time interval (for example greater than 1 hour),
  or until an event generates the need to change the operating conditions of the valve.

Going now in greater detail in the description of the determination of the value of the control parameter Pc, it should be noted that it is for example calculated as a function of the first or the previous value ($\Delta T_1$; $\Delta T_i$) of the temperature difference between upstream and downstream of the exchanger 7 and of the second or subsequent value ($\Delta T_2$; $\Delta T_{i+1}$) of the temperature difference between upstream and downstream of the exchanger 7. More generally, the step of calculating the value taken by the control parameter (Pc) provides for calculating the control parameter as a function of a plurality of values ($\Delta T_1$, $\Delta T_x$, $\Delta T_2$) assumed by the temperature difference in the transition of the flow regulator from said first to said second operating condition. This allows to obtain a number of information on the temperature difference across a given change in the flow parameter (for example a given change in the flow-rate of fluid crossing the exchanger 7), and thus avoids that the process may make assessments on a punctual value only taken by the temperature difference. Rather, the control parameter is representative of an area under a characterizing curve or function which relates the temperature difference ($\Delta T$) with the flow parameter ($\varphi$; $\Delta p$), thereby mediating the instantaneous values that may be taken for example by the temperature difference. Moreover, as the temperature difference is used (and not for example a single temperature value) as main ingredient for the calculation of the control parameter, there is also a 'compensation effect' because any possible error in the detection of temperatures is compensated since what matters is the difference and not the absolute values taken by the temperature.

For example, in accordance with a relatively simple way of implementing this aspect of the invention, the control parameter (Pc) may calculated as a function at least of: the first value $\varphi_1$; $\Delta p_1$) of the flow parameter ($\varphi$; $\Delta p$), the first value ($\Delta T_1$) of said temperature difference, the second value ($\varphi_2$; $\Delta p_2$) of the flow parameter, and the second value ($\Delta T_2$) of said temperature difference.

Figure 7:
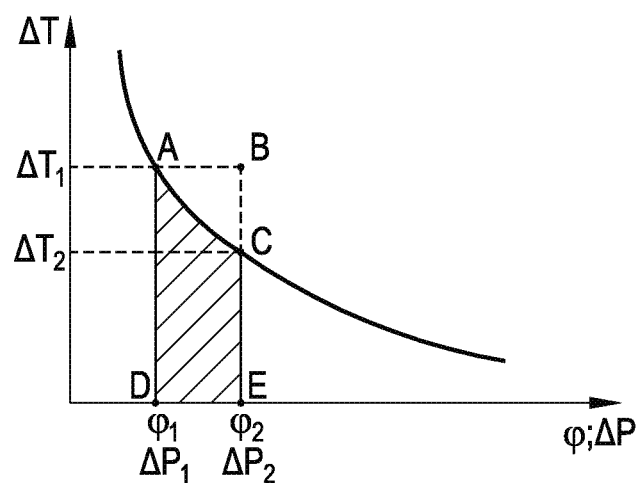
FIG. 7 is a Cartesian diagram representing a characteristic curve relating to a heat exchanger present in a service line of a conditioning and/or heating system according to the present invention, in which a flow rate parameter of the carrier fluid passing through the exchanger (for example, the mass flow or the pressure drop across a calibrated orifice) is shown the abscissa and the thermal drop of the carrier fluid between a section of the upstream service line and a section of the service line downstream of the exchanger itself is shown on the ordinate.

In accordance with a currently preferred aspects, assuming to represent temperature difference vs. flow parameter in a two-dimensional Cartesian system where the values of the flow parameter ($\varphi$; $\Delta p$) are reported on the abscissa and the values of the temperature difference on the ordinate ($\Delta T$) (see FIG. 7), then the control parameter is representative of an area under a characterizing curve or function which relates the temperature difference ($\Delta T$) with the flow parameter ($\varphi$; $\Delta p$).

According to a further aspect, the processing unit may calculate the value of the control parameter Pc as integral, between the first or previous value of the flow rate parameter ($\varphi_1$, $\varphi_i$; $\Delta p_1$, $\Delta p_i$) and the second or subsequent value of the flow rate parameter ($\varphi_2$, $\varphi_{i+1}$; $\Delta p_2$, $\Delta p_{i+1}$), of the function or characteristic curve of the exchanger 7 which relates the temperature difference ($\Delta T$) with the flow rate parameter ($\varphi$; $\Delta p$). In practice, with reference to FIG. 7, if the flow rate parameter is the carrier fluid mass flow rate ($\varphi$) passing through the heat exchange unit 7, the processing unit determines (following the successive increases in flow rate) the characteristic function that relates the temperature difference ($\Delta T$) with the carrier fluid mass flow ($\varphi$) passing through the heat exchange unit 7, and then calculates the value of the control parameter (Pc) as integral, between the first or previous value of the flow rate parameter $\varphi_1$, $\varphi_i$) and the second or subsequent value of the flow rate parameter ($\varphi_2$, $\varphi_{i+1}$), of the characteristic function that relates the temperature difference ($\Delta T$) with the mass flow of carrier fluid ($\varphi$) passing through the heat exchange unit 7 using the following formula:

$$Pc = \int_{\varphi p i}^{\varphi i+1} \Delta T d\varphi, \text{ wherein } i=0, 1, 2 \quad (1).$$

Alternatively, if the service line 5 comprises a calibrated orifice 52 inserted upstream or downstream of said flow regulator (as in the example of FIG. 3), the flow rate parameter may be the pressure difference ($\Delta p$) between a first pressure inlet of the service line 5 upstream of the calibrated orifice 52 and a second pressure outlet of the same service line 5 located downstream of the calibrated orifice 52. In this case, the processing unit, following the successive positions reached by the shut-off element 20, determines a characteristic function which relates the temperature difference ($\Delta T$) with said pressure difference ($\Delta p$). Therefore, the processing unit calculates the value of the control parameter (Pc) as integral, between the first or previous value of the flow rate parameter ($\Delta p_1$, $\Delta p_i$) and the second or subsequent value of the flow rate parameter ($\Delta p_2$, $\Delta p_{i+1}$), of the characteristic function or curve that relates the temperature difference ($\Delta T$) with said pressure difference ($\Delta p$), using the following formula:

$$Pc = \int_{\Delta p i}^{\Delta p i+1} \Delta T d\Delta p, \text{ wherein } i=0, 1, 2 \quad (2)$$

From a practical point of view, the function or characteristic curve function that relates the temperature difference ($\Delta T$) with the flow rate parameter ($\varphi$; $\Delta p$) may be known or may be determined during the control process.

For example, the processing unit may be configured for the mathematical determination of an approximating function which relates the temperature difference ($\Delta T$) with the flow rate parameter ($\varphi$; $\Delta p$) and which has a trend close to said characteristic function: the approximating function may in particular be a parametric function, such as a polynomial, whose coefficients are determined by imposing the passage of the parametric polynomial by the known points obtained by measuring the values assumed by the temperature difference at the various values of the flow rate parameter. The value of the integral, obtained according to the case using the formula (1) or the formula (2) above, is then calculated as an integral between the first or previous value of the flow rate parameter ($\varphi_1$, $\varphi_i$; $\Delta p_1$, $\Delta p_i$) and the second or subsequent value of the flow rate parameter ($\varphi p_2$, $\varphi_{i+1}$; $\Delta p_2$, $\Delta p_{i+1}$) of the approximating function, for example of the polynomial.

Alternatively, the integrals defined above may be calculated in a discrete manner as an area or sum of areas (i.e. without the need to determine a true characteristic function), using the known points of the characteristic curve (points A and C in FIG. 7): for example the ACED area subtended by the portion of the AC curve may be estimated as the area of the rectangle trapezoid ACED.

More generally, in this case, the processing unit calculates the integral, between the first or previous value of the flow rate parameter ($\varphi_1$, $\varphi_i$; $\Delta p_1$, $\Delta p_i$) and the second or subsequent value of the flow rate parameter ($\varphi_2$, $\varphi_{i+1}$; $\Delta p_2$, $\Delta p_{i+1}$), as follows:

$Pc=(\Delta T_{i+1}-\Delta T_i)*(\varphi_{i+1}-\varphi_i)/2$, wherein i=0, 1, 2 ...

if the flow parameter is the mass flow of the carrier fluid ($\varphi$) passing through the heat exchange unit 7;

or as follows:

$Pc=(\Delta T_{i+1}-\Delta T_i)*(\Delta p_{i+1}-\Delta p_i)/2$, wherein=0, 1, 2 ...

if the flow parameter is the pressure difference ($\Delta p$) between a first pressure intake of the service line 5 upstream of the calibrated orifice 52 and a second pressure intake of the same service line 5 placed downstream of the calibrated orifice 52.

As regards the determination of the value of the minimum threshold S, it may be:

a fixed invariable value; in this case, S is fixed independent of other parameters or factors;

a predetermined value linked to the magnitude of the increase in the value of the flow rate parameter ($\varphi$; $\Delta p$) from said first or previous value ($\varphi_1$, ($\varphi_i$; $\Delta p_1$; $\Delta p_i$) to the second or subsequent value ($\varphi_2$, $\varphi_{i+1}$; $\Delta p_2$, $\Delta p_{i+1}$); in this case, tables may be provided for each type of heat exchanger, which associate a predetermined threshold value based on the extent of the increase in the flow rate parameter;

a value calculated as a function of the magnitude of the increase in the value of the flow parameter ($\varphi$; $\Delta p$) from said first or previous value ($\varphi_1$, $\varphi_i$; $\Delta p_1$, $\Delta p_i$) to the second or subsequent value ($\varphi_2$, $\varphi_{i+1}$; $\Delta p_2$, $\Delta p_{i+1}$);

a value calculated as a multiplication of:

the increase in the value of the flow parameter ($\varphi$; $\Delta p$) from said first or previous value ($\varphi_1$, $\varphi_i$; $\Delta p_1$, $\Delta p_i$) to the second or subsequent value ($\varphi_2$, $\varphi_{i+1}$; $\Delta p_2$, $\Delta p_{1+1}$), and the first or previous value ($\Delta T_1$, $\Delta T_i$) of said temperature difference, using one of the following formulas $S=(\Delta T_i)*(\Delta p_{i+1}-\Delta p_i)$, wherein=0, 1, 2 ...

$S=(\Delta T_i)*\varphi_{i+1}-\varphi p_i)$, wherein=0, 1, 2 ...

As already described in the section relating to the system, the first or previous value ($\Delta T_1$, $\Delta T_i$) of the temperature difference is determined starting from the temperature signal or signals detected when the flow regulator is in the first or previous operating condition, and the second or subsequent value ($\Delta T_2$, $\Delta T_{i+1}$) of the temperature difference is determined starting from said temperature signal or signals detected when the flow regulator is in the second or subsequent operating condition. In turn, the variation of the flow rate parameter is measured or calculated as described above.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of controlling a flow of a carrier fluid through a service line of a conditioning and/or heating system, the service line includes:

at least one heat exchange unit, at least one flow regulator configured to control the flow of carrier fluid passing through the heat exchange unit, and at least one temperature sensor configured to determine a temperature difference between the carrier fluid in a first section of the service line upstream of said heat exchange unit and the carrier fluid in a second section of the service line downstream of the same heat exchange unit;

the method comprises:

a) positioning the flow regulator in a first operating condition which corresponds to a first value ($\varphi_i$; $\Delta p_1$) of a flow parameter ($\varphi$; $\Delta p$) relative to the flow of the carrier fluid passing through the heat exchanger, and a first value ($\Delta T_1$) of said temperature difference, b) positioning the flow regulator in a second operating condition which corresponds an increase in the value of the flow parameter ($\varphi$; $\Delta p$) from said first value ($\varphi_1$; $\Delta p_1$) to a second value ($\varphi_2$; $\Delta p_2$) higher than the first value ($\varphi_1$; $\Delta p_1$), and to a second value ($\Delta T_2$) of said temperature difference, c) calculating a value of a control parameter (Pc) which is a function of one or more values assumed by said temperature difference in a transition of the flow regulator from said first operating condition to said second operating condition, wherein representative values of the temperature difference ($\Delta T$) and values of the flow parameter ($\varphi$; $\Delta p$) are related by a two-dimensional Cartesian system where the values of the flow parameter ($\varphi$; $\Delta p$) are reported on an abscissa of the two-dimensional Cartesian system and the values of the temperature difference ($\Delta T$) are reported on an ordinate of the two-dimensional Cartesian system, and the control parameter is representative by an area under a characterizing curve on the two-dimensional Cartesian system which relates the representative values of the temperature difference ($\Delta T$) with the representative values of the flow parameter ($\varphi$; $\Delta p$);

d) comparing said value of the control parameter (Pc) with a minimum threshold (S) to determine whether or not the value of the control parameter (Pc) is higher than said minimum threshold (S);

wherein in response to a determination in step d) that the value of the control parameter is higher than said minimum threshold, the control process executes the following steps:

e) positioning the flow regulator from the second operating condition in a subsequent operating condition which corresponds to: (i) an increase in the value of the flow parameter ($\varphi$; $\Delta p$) from said second value ($\varphi_2$; $\Delta p_2$) to a subsequent value ($\varphi_{i+1}$; $\Delta p_{i+1}$) higher than the second value; and (ii) a variation from the second value ($\Delta T_2$) to a subsequent value ($\Delta T_{i+1}$) of said temperature difference, f) calculating a further value assumed by the control parameter (Pc) which is a function of one or more values assumed by said temperature difference in transition of the flow regulator from the second operating condition to said subsequent operating condition, and g) comparing said further value of the control parameter (Pc) with the minimum threshold (S) to determine whether or not the further value of the control parameter is higher than said minimum threshold;

wherein in response to a determination made in said step d) or said step g) that the value of the control parameter (Pc) is less than or equal to said minimum threshold (S), then not changing the operating condition of the flow regulator in the direction of a further increase in the value of the flow parameter ($\varphi$; $\Delta p$).

2. The method according to claim 1, wherein if, following step g), it is determined that the value of the control parameter is higher than said minimum threshold, the process provides for repeating steps e) to g) for further subsequent operating conditions of the flow regulator until at step g) of the cycle it is determined that the value reached by the control parameter (Pc) becomes equal or smaller than the minimum threshold (S).

3. The method according to claim 2, wherein:
said step c) of calculating the value of the control parameter (Pc) further comprises calculating an integral, between the first value of the flow parameter ($\varphi_i$; $\Delta p_1$) and the second value of the flow parameter ($\varphi_2$; $\Delta p_2$), of the characteristic function that correlates the temperature difference ($\Delta T$) with the flow parameter ($\varphi$; $\Delta p$); and
said step g) of calculating the value of the control parameter (Pc) further comprises calculating an integral, between the second value of the flow parameter ($\varphi_2$; $\Delta p_2$) and the subsequent value of the flow parameter ($\varphi_{i+1}$; $\Delta p_{i+1}$), of the characteristic function that correlates the temperature difference ($\Delta T$) with the flow parameter ($\varphi$; $\Delta p$);
wherein, for each subsequent execution of the cycle, at said step g) calculating the value of the control parameter (Pc) comprises calculating an integral, between a previous value of the flow parameter ($\varphi_{i+1}$; $\Delta p_{i+1}$) reached at the last execution of the cycle and a further subsequent value of the flow parameter ($\varphi_{i+1}$; $\Delta p_{i+2}$), of the characteristic function that correlates the temperature difference ($\Delta T$) with the flow parameter ($\varphi$; $\Delta p$).

4. The method according to claim 3, wherein the steps of calculating the value of the control parameter (Pc) includes calculating the integral, between the first or previous value of the flow parameter ($\varphi_1$, $\varphi_i$) and the second or subsequent value of the flow parameter ($\varphi_2$, $\varphi_{i+1}$),
$Pc = \int_{\varphi_i}^{\varphi_{i+1}} \Delta T d\varphi$, wherein i=0, 1, 2 . . .
of the characteristic function that correlates the temperature difference ($\Delta T$) with the mass flow of the carrier fluid ($\varphi$) passing through the heat exchange unit (7); or
wherein the service line includes a calibrated orifice, inserted upstream or downstream of said flow regulator, and the flow parameter is a pressure difference ($\Delta p$) between a first pressure intake of the service line upstream of the calibrated orifice and a second pressure intake of the same service line placed downstream of the calibrated orifice, and wherein calculating the value of the control parameter (Pc) includes calculating the integral, between the first or previous value of the flow parameter ($\Delta p_1$, $\Delta p_i$) and the second or subsequent value of the flow parameter ($\Delta p_2$, $\Delta p_{i+1}$),
$Pc = \int_{\Delta p_i}^{\Delta p_{i+1}} \Delta T d\Delta p$, wherein i=0, 1, 2 . . .
of the characteristic function that correlates the temperature difference ($\Delta T$) with said pressure difference ($\Delta p$).

5. The method according to claim 4, further comprising a step of mathematically determining an approximating function which correlates the temperature difference ($\Delta T$) with the flow parameter ($\varphi$; $\Delta p$).

6. The method according to claim 4, wherein said integral between the first or previous value of the flow parameter ($\varphi_1$, $\varphi_i$; $\Delta p_1$, $\Delta p_i$) and the second or subsequent value of the flow parameter ($\varphi_2$, $\varphi_{i+1}$, $\Delta p_2$, $\Delta p_{i+1}$) is calculated as
$Pc = (\Delta T_{i+1} - \Delta T_i) * (\varphi_{i+1} - \varphi_i)/2$, wherein i=0, 1, 2 . . .
with the flow parameter being the mass flow of the carrier fluid ($\varphi$) passing through the heat exchange unit; or
said integral between the first or previous value of the flow parameter ($\varphi_1$, $\varphi_i$; $\Delta p_1$, $\Delta p_i$) and the second or subsequent value of the flow parameter ($\varphi_2$, $\varphi_{i+1}$, $\Delta p_2$, $\Delta p_{i+1}$) is calculated as:
$Pc = (\Delta T_{i+1} - \Delta T_i) * (\Delta p_{i+1} - \Delta p_i)/2$, wherein i=0, 1, 2 . . .
with the flow parameter being the pressure difference ($\Delta p$) between a first pressure intake of the service line (5) upstream of the calibrated orifice (52) and a second pressure intake of the same service line (5) placed downstream of the calibrated orifice (52).

7. The method according to claim 1, wherein if, following said step d) or said step g), it is determined that the value of the control parameter (Pc) is less than or equal to said minimum threshold (S), then the process provides for setting, as optimal working position to which the flow regulator is maintained at one of the following: (i) the last operating condition reached by the flow regulator during said cycle, (ii) the penultimate operating condition reached by the flow regulator during the cycle, and (iii) a condition obtained changing said last operating condition of the flow regulator by a prefixed step in the direction of a decrease in the value of the flow parameter ($\varphi$; $\Delta p$).

8. The method according to claim 1, wherein the flow parameter is the mass flow of the carrier fluid ($\varphi$) passing through the heat exchange unit.

9. The method according to claim 1, wherein said minimum threshold (S) has:
an invariable predetermined value; or
a predetermined value linked to the magnitude of the increase in the value of the flow parameter ($\varphi$; $\Delta p$) from said first or previous value ($\varphi_1$, $\varphi_i$; $\Delta p_1$, $\Delta p_i$) to the second or subsequent value ($\varphi_2$, $\varphi_{i+1}$; $\Delta p_2$, $\Delta p_{i+1}$).

10. The method according to claim 1, wherein said minimum threshold (S) has:
a value calculated as a function of the magnitude of the increase in the value of the flow parameter ($\varphi$; $\Delta p$) from said first or previous value ($\varphi_1$, $\varphi_i$; $\Delta p_1$, $\Delta p_i$) to the second or subsequent value ($\varphi_2$, $\varphi_{i+}$; $\Delta p_2$, $\Delta p_{i+1}$); or
a value calculated as a product of:
the increase in the value of the flow parameter ($\varphi$; $\Delta p$) from said first or previous value ($\varphi_1 \varphi_i$; $\Delta p_1$, $\Delta p_i$) to the second or subsequent value ($\varphi_2$, $\varphi_{i+1}$; $\Delta p_2$, $\Delta p_{i+1}$), and
the first or previous value ($\Delta T_1$, $\Delta T_i$) of said temperature difference,
using one of the following formulas $S = (\Delta T_i) * (\Delta p_{i+1} - \Delta p_i)$, wherein i=0, 1, 2 . . . n, $S = (\Delta T_i) * (\varphi_{i+1} - \varphi_i)$, wherein I=0, 1, 2 . . . n.

11. The method according to claim 1, wherein the process provides the following:
in said step a) of positioning the flow regulator in a first operating condition, the flow regulator is controlled until the first value ($\varphi_1$; $\Delta p_1$) of the flow parameter ($\varphi$; $\Delta p$) is reached, which is a pre-set value;
in said step b) of positioning the flow regulator in a second operating condition, the flow regulator is controlled until the second value ($\varphi_2$; $\Delta p_2$) of the flow parameter ($\varphi$; $\Delta p$) is reached, which is a pre-set value;
in said step e) of positioning the flow regulator in a subsequent operating condition, the flow regulator is controlled until the subsequent value ($\varphi_{i+1}$; $\Delta p_{i+1}$) of the flow parameter ($\varphi$; $\Delta p$) is reached, which is a pre-set value.

12. The method according to claim 1, wherein the flow parameter is the mass flow of the carrier fluid ($\varphi$) passing through the heat exchange unit;
   wherein either said service line comprises a flow meter, and the flow meter is configured to measure the mass flow of a carrier fluid ($\varphi$) passing through the heat exchange unit; or said service line comprises a position sensor of a shut-off element present in the flow regulator, and wherein the mass flow of carrier fluid ($\varphi$) passing through the heat exchange unit is calculated as a function of the position taken by the shut-off device and the pressure drop to the heads of the flow regulator; or the service line comprises a calibrated orifice, inserted upstream or downstream of said flow regulator, and the mass flow of carrier fluid ($\varphi$) is calculated as a function of the pressure difference ($\Delta p$) between a first pressure intake of the service line upstream of the calibrated orifice and a second pressure intake of the same service line located downstream of the calibrated orifice.

13. A method of controlling a flow of a carrier fluid through a service line of a conditioning and/or heating system,
   the service line includes:
   at least one heat exchange unit,
   at least one flow regulator configured to control the flow of carrier fluid passing through the heat exchange unit, and
   at least one temperature sensor configured to determine a temperature difference between the carrier fluid in a first section of the service line upstream of said heat exchange unit and the carrier fluid in a second section of the service line downstream of the same heat exchange unit;
   the method comprises:
   a) positioning the flow regulator in a first operating condition which corresponds to a first value ($\varphi_1$; $\Delta p_1$) of a flow parameter ($\varphi$; $\Delta p$) relative to the flow of the carrier fluid passing through the heat exchanger, and a first value ($\Delta T_1$) of said temperature difference,
   b) positioning the flow regulator in a second operating condition which corresponds an increase in the value of the flow parameter ($\varphi$; $\Delta p$) from said first value ($\varphi_1$; $\Delta p_1$) to a second value ($\varphi_2$; $\Delta p_2$) higher than the first value ($\varphi_1$; $\Delta p_1$), and to a second value ($\Delta T_2$) of said temperature difference,
   c) calculating a value of a control parameter (Pc) which is a function of one or more values assumed by said temperature difference in a transition of the flow regulator from said first operating condition to said second operating condition, wherein the calculation of the value of the control parameter (Pc) comprises calculating an integral, between the first value of the flow parameter ($\varphi_1$; $\Delta p_1$) and the second value of the flow parameter ($\varphi_2$; $\Delta p_2$), of a characteristic function that correlates the temperature difference ($\Delta T$) with the flow parameter ($\varphi$; $\Delta p$); and
   d) comparing said value of the control parameter (Pc) with a minimum threshold (S) to determine whether or not the value of the control parameter (Pc) is higher than said minimum threshold (S);
   wherein in response to a determination in step d) that the value of the control parameter is higher than said minimum threshold, the control process provides to executes the following steps:
   e) positioning the flow regulator from the second operating condition in a subsequent operating condition which corresponds to: (i) an increase in the value of the flow parameter ($\varphi$; $\Delta p$) from said second value ($\varphi_2$; $\Delta p_2$) to a subsequent value ($\Delta_{i+1}$; $\Delta p_{i+1}$) higher than the second value; and (ii) a variation from the second value ($\Delta T_2$) to a subsequent value ($\Delta T_{i+1}$) of said temperature difference,
   f) calculating a further value assumed by the control parameter (Pc) which is a function of one or more values assumed by said temperature difference in transition of the flow regulator from the second operating condition to said subsequent operating condition, and
   g) comparing said further value of the control parameter (Pc) with the minimum threshold (S) to determine whether or not the further value of the control parameter is higher than said minimum threshold; wherein the calculation of the value of the control parameter (Pc) comprises calculating an integral, between the second value of the flow parameter ($\varphi_2$; $\Delta p_2$) and the subsequent value of the flow parameter ($\varphi_{i+1}$; $\Delta p_{i+1}$), of the characteristic function that correlates the temperature difference ($\Delta T$) with the flow parameter ($\varphi$; $\Delta p$);
   wherein in response to a determination in step d) or step g) that the value of the control parameter (Pc) is less than or equal to said minimum threshold (S), then not changing the operating condition of the flow regulator in a direction of a further increase in the value of the flow parameter ($\varphi$; $\Delta p$).

14. The method according to claim 13, wherein the step c) of calculating the value of the control parameter (Pc) further includes calculating the integral, between the first or previous value of the flow parameter ((pi, (pi) and the second or subsequent value of the flow parameter ($\varphi_2$, $\varphi_{i+1}$),
   $Pc = \int_{\varphi_i}^{\varphi_{i+1}} \Delta T d\varphi$, wherein i=0, 1, 2 . . .
   of the characteristic function that correlates the temperature difference ($\Delta T$) with the mass flow of the carrier fluid ($\varphi$) passing through the heat exchange unit; or
   wherein the service line includes a calibrated orifice, inserted upstream or downstream of said flow regulator, and the flow parameter is a pressure difference ($\Delta p$) between a first pressure intake of the service line upstream of the calibrated orifice and a second pressure intake of the same service line placed downstream of the calibrated orifice, and wherein calculating the value of the control parameter (Pc) includes calculating the integral, between the first or previous value of the flow parameter ($\Delta p_1$, $\Delta p_i$) and the second or subsequent value of the flow parameter ($\Delta p_2$, $\Delta p_{i+1}$),
   $Pc = \int_{\Delta p_i}^{\Delta p_{i+1}} \Delta T d\Delta p$, wherein i=0, 1, 2 . . .
   of the characteristic function that correlates the temperature difference ($\Delta T$) with said pressure difference ($\Delta p$).

15. The method according to claim 14, further comprising a step of mathematically determining an approximating function which correlates the temperature difference ($\Delta T$) with the flow parameter ($\varphi$; $\Delta p$).

16. The method according to claim 14, wherein:
   said integral, between the first or previous value of the flow parameter ($\varphi_1$, $\varphi_i$; $\Delta p_1$, $\Delta p_i$), and the second or subsequent value of the flow parameter ($\varphi_2$, $\varphi_{i+1}$, $\Delta p_2$, $\Delta p_{i+1}$), is calculated as
   $Pc = (\Delta T_{i+1} - \Delta T_i) * (\varphi_{i+1} - \varphi_i)/2$, wherein i=0, 1, 2 . . .
   with the flow parameter being the mass flow of the carrier fluid ($\varphi$) passing through the heat exchange unit; or
   said integral, between the first or previous value of the flow parameter ($\varphi_1$, $\varphi_i$; $\Delta p_1$, $\Delta p_i$) and the second or subsequent value of the flow parameter ($\varphi_2$, $\varphi_{i+1}$, $\Delta p_2$, $\Delta p_{i+1}$), is
   $Pc = (\Delta T_{i+1} - \Delta T_i) * (\Delta p_{i+1} - \Delta p_i)/2$, wherein i=0, 1, 2 . . .

with the flow parameter being the pressure difference ($\Delta p$) between a first pressure intake of the service line upstream of the calibrated orifice and a second pressure intake of the same service line downstream of the calibrated orifice.

17. The method according to claim 13, wherein if, following step g), it is determined that the value of the control parameter is higher than said minimum threshold, the process provides for repeating steps e) to g) for further subsequent operating conditions of the flow regulator until at step g) of the cycle it is determined that the value reached by the control parameter (Pc) becomes equal or smaller than the minimum threshold (S).

18. The method according to claim 13, wherein if, following said step d) or said step g), it is determined that the value of the control parameter (Pc) is less than or equal to said minimum threshold (S), then the process provides for setting, as optimal working position to which the flow regulator is maintained at one of the following: (i) the last operating condition reached by the flow regulator during said cycle, (ii) the penultimate operating condition reached by the flow regulator during the cycle, and (iii) a condition obtained changing said last operating condition of the flow regulator by a prefixed step in the direction of a decrease in the value of the flow parameter ($\varphi$; $\Delta p$).

19. The method according to claim 13, wherein the flow parameter is the mass flow of the carrier fluid ($\varphi$) passing through the heat exchange unit.

20. The method according to claim 13, wherein said minimum threshold (S) has:
an invariable predetermined value; or
a predetermined value linked to the magnitude of the increase in the value of the flow parameter ($\varphi$; $\Delta p$) from said first or previous value ($\varphi_1$, $\varphi_i$; $\Delta p_1$, $\Delta p_i$) to the second or subsequent value ($\varphi_2$, $\varphi_{i+1}$; $\Delta p_2$, $\Delta p_{i+1}$).

21. The method according to claim 13, wherein said minimum threshold (S) has:
a value calculated as a function of the magnitude of the increase in the value of the flow parameter ($\varphi$; $\Delta p$) from said first or previous value ($\varphi_1$, $\varphi_i$; $\Delta p_1$, $\Delta p_i$) to the second or subsequent value ($\varphi_2$, $\varphi_{i+1}$; $\Delta p_2$, $\Delta p_{i+1}$); or
a value calculated as a product of:
the increase in the value of the flow parameter ($\varphi$; $\Delta p$) from said first or previous value ($\varphi_1$, $\varphi_i$; $\Delta p_1$, $\Delta p_i$) to the second or subsequent value ($\varphi_2$, $\varphi_{i+1}$; $\Delta p_2$, $\Delta p_{i+1}$), and
the first or previous value ($\Delta T_1$, $\Delta T_i$) of said temperature difference,
using one of the following formulas $S=(\Delta T_i)*(\Delta p_{i+1}-\Delta p_i)$, wherein i=0, 1, 2 ... n, $S=(\Delta T_i)*(\varphi_{i+1}-\varphi_1)$, wherein I=0, 1, 2 ... n.

22. The method according to claim 13, wherein the process provides the following:
in said step a) of positioning the flow regulator in a first operating condition, the flow regulator is controlled until the first value ($\varphi_1$; $\Delta p_1$) of the flow parameter ($\varphi$; $\Delta p$) is reached, which is a pre-set value;
in said step b) of positioning the flow regulator in a second operating condition, the flow regulator is controlled until the second value ($\varphi_2$; $\Delta p_2$) of the flow parameter ($\varphi$; $\Delta p$) is reached, which is a pre-set value;
in said step e) of positioning the flow regulator in a subsequent operating condition, the flow regulator is controlled until the subsequent value ($\varphi_{i+1}$; $\Delta p_{i+1}$) of the flow parameter ($\varphi$; $\Delta p$) is reached, which is a pre-set value.

23. The method according to claim 13, wherein the flow parameter is the mass flow of the carrier fluid ($\varphi$) passing through the heat exchange unit;
wherein either said service line comprises a flow meter, and the flow meter is configured to measure the mass flow of a carrier fluid ($\varphi$) passing through the heat exchange unit; or said service line comprises a position sensor of a shut-off element present in the flow regulator, and wherein the mass flow of carrier fluid ($\varphi$) passing through the heat exchange unit is calculated as a function of the position taken by the shut-off device and the pressure drop to the heads of the flow regulator; or the service line comprises a calibrated orifice, inserted upstream or downstream of said flow regulator, and the mass flow of carrier fluid ($\varphi$) is calculated as a function of the pressure difference ($\Delta p$) between a first pressure intake of the service line upstream of the calibrated orifice and a second pressure intake of the same service line located downstream of the calibrated orifice.

24. An air conditioning and/or heating system comprising a carrier fluid distribution circuit having:
at least one delivery line of the carrier fluid,
at least one return line of the carrier fluid, and
a plurality of service lines connected directly or indirectly to said delivery line and to said return line and configured to serve respective rooms to be conditioned and/or heated,
wherein each of said service lines comprises:
at least one heat exchange unit,
at least one flow regulator configured to control the flow of carrier fluid passing through the heat exchange unit, and
at least one temperature sensor configured for allowing determination of a temperature difference between the carrier fluid in a first section of the service line upstream of said heat exchange unit and carrier fluid in a second section of the same service line downstream of the same heat exchange unit;
at least one central heat treatment unit located on the circuit, at least one control device comprising a processing unit connected or connectable to the flow regulator and to the temperature sensor or temperature sensors of each service line and configured to:
a) position the flow regulator in a first operating condition to which the following corresponds to:
a first value ($\varphi_1$; $\Delta p_1$) of a flow parameter ($\varphi$; $\Delta p$) relative to the flow of carrier fluid passing through the heat exchanger, and
a first value ($\Delta T_1$) of said temperature difference,
b) position the flow regulator in a second operating condition to which the following corresponds
an increase in the value of the flow parameter ($\varphi$; $\Delta p$) from said first value ($\varphi_1$; $\Delta p_1$) to a second value ($\varphi_2$; $\Delta p_2$) higher than the first value ($\varphi_1$; $\Delta p_1$) and
a second value ($\Delta T_2$) of said temperature difference,
c) calculate a value assumed by a control parameter (Pc) which is a function of one or more values assumed by said temperature difference in the transition of the flow regulator from said first to said second operating condition,
d) compare said value of the control parameter (Pc) with a minimum threshold (S) to determine whether or not the value of the control parameter (Pc) is higher than said minimum threshold (S);

wherein in response to a determination in step d) that the value of the control parameter is higher than said minimum threshold, the control process executes the following steps:

e) position the flow regulator from the second operating condition in a subsequent operating condition which corresponds to:
  an increase in the value of the flow parameter ($\varphi$; $\Delta p$) from said second value ($\varphi_2$; $\Delta p_2$) to a subsequent value ($\varphi_{i+1}$; $\Delta p_{i+1}$) higher than the second value; and
  a variation from the second value ($\Delta T_2$) to a subsequent value ($\Delta T_{i+1}$) of said temperature difference, f) calculate a further value assumed by the control parameter (Pc) which is a function of one or more values assumed by said temperature difference in the transition of the flow regulator from the second operating condition to said subsequent operating condition, and g) compare said further value of the control parameter (Pc) with the minimum threshold (S) to determine whether or not the further value of the control parameter is higher than said minimum threshold;

wherein when, following said step d) or said step g), a determination is made that the value of the control parameter (Pc) is less than or equal to said minimum threshold (S), then not changing the operating condition of the flow regulator in the direction of a further increase in the value of the flow parameter ($\varphi$; $\Delta p$), wherein in each service line:

the flow regulator comprises at least one valve having a valve body having at least one inlet, at least one outlet connected by at least one passage which puts the inlet in fluid communication with the outlet, and at least one shut-off element operating in said passage, said shut-off element defining, in cooperation with the valve body, a fluid passage gap of variable width as a function of positions assumed by the shut-off element with respect to the valve body;

the temperature sensor comprises a first temperature detector configured to detect the temperature in a first section of each channel upstream of said heat exchange unit and a second temperature detector configured to detect the temperature in a second section of each channel downstream of the same heat exchange unit, or a differential temperature sensor connected to the first section of each channel upstream of said heat exchange unit and to the second section of each channel downstream of the same heat exchange unit and configured to detect the temperature difference between said first and said second section of each service line;

at least one hydraulic sensor is provided comprising at least one of a flowmeter configured to detect the mass flow of carrier fluid ($\varphi$) passing through the heat exchange unit, or a differential pressure sensor configured to detect a pressure difference between a first section of the service line upstream of a calibrated orifice and a second section of the same service line located downstream of the calibrated orifice, the calibrated orifice being preferably upstream of the flow regulator.

25. An air conditioning and/or heating system comprising a carrier fluid distribution circuit having:
at least one delivery line of the carrier fluid,
at least one return line of the carrier fluid, and
a plurality of service lines connected directly or indirectly to said delivery line and to said return line and configured to serve respective rooms to be conditioned and/or heated, wherein each of said service lines comprises:
at least one heat exchange unit,
at least one flow regulator configured to control the flow of carrier fluid passing through the heat exchange unit, and
at least one temperature sensor configured for allowing determination of a temperature difference between the carrier fluid in a first section of the service line upstream of said heat exchange unit and carrier fluid in a second section of the same service line downstream of the same heat exchange unit;

at least one central heat treatment unit located on the circuit, at least one control device comprising a processing unit connected or connectable to the flow regulator and to the temperature sensor or temperature sensors of each service line and configured to:

a) position the flow regulator in a first operating condition to which the following corresponds to a first value ($\varphi_1$; $\Delta p_1$) of a flow parameter ($\varphi$; $\Delta p$) relative to the flow of carrier fluid passing through the heat exchanger, and a first value ($\Delta T_1$) of said temperature difference, b) position the flow regulator in a second operating condition to which the following corresponds
an increase in the value of the flow parameter ($\varphi$; $\Delta p$) from said first value ($\varphi_1$; $\Delta p_1$) to a second value ($\varphi_2$; $\Delta p_2$) higher than the first value ($\varphi_1$; $\Delta p_1$) and a second value ($\Delta T_2$) of said temperature difference, c) calculate a value assumed by a control parameter (Pc) which is a function of one or more values assumed by said temperature difference in the transition of the flow regulator from said first to said second operating condition, d) compare said value of the control parameter (Pc) with a minimum threshold (S) to determine whether or not the value of the control parameter (Pc) is higher than said minimum threshold (S);

wherein in response to a determination in step d) that the value of the control parameter is higher than said minimum threshold, the control process executes the following steps:

e) position the flow regulator from the second operating condition in a subsequent operating condition which corresponds to:
an increase in the value of the flow parameter ($\varphi$; $\Delta p$) from said second value ($\varphi_2$; $\Delta p_2$) to a subsequent value ($\varphi_{i+1}$; $\Delta p_{i+1}$) higher than the second value; and
a variation from the second value ($\Delta T_2$) to a subsequent value ($\Delta T_{i+1}$) of said temperature difference, f) calculate a further value assumed by the control parameter (Pc) which is a function of one or more values assumed by said temperature difference in the transition of the flow regulator from the second operating condition to said subsequent operating condition, and g) compare said further value of the control parameter (Pc) with the minimum threshold (S) to determine whether or not the further value of the control parameter is higher than said minimum threshold; and wherein in response to a determination in step d) or said step g) that the value of the control parameter (Pc) is less than or equal to said minimum threshold (S), then not changing the operating condition of the flow regulator in the direction of a further increase in the value of the flow parameter ($\varphi$; $\Delta p$), wherein in each service line:
- the flow regulator comprises at least one valve having a valve body having at least one inlet, at least one outlet connected by at least one passage which puts the inlet in fluid communication with the outlet, and at least one shut-off element operating in said passage, said shut-off element defining, in cooperation with the valve body, a fluid passage gap of variable width as a function of positions assumed by the shut-off element with respect to the valve body;
- the temperature sensor comprises a first temperature detector configured to detect the temperature in a first section of each channel upstream of said heat exchange unit and a second temperature detector configured to detect the temperature in a second section of each channel downstream of the same heat exchange unit, or a differential temperature sensor connected to the first section of each channel upstream of said heat exchange unit and to the second section of each channel downstream of the same heat exchange unit and configured to detect the temperature difference between said first and said second section of each service line;
- at least one hydraulic sensor is provided comprising at least one of a flowmeter configured to detect the mass flow of carrier fluid ($\varphi$) passing through the heat exchange unit, or a differential pressure sensor configured to detect a pressure difference between a first section of the service line upstream of a calibrated orifice and a second section of the same service line located downstream of the calibrated orifice, the calibrated orifice being preferably upstream of the flow regulator.

26. An air conditioning and/or heating system comprising a carrier fluid distribution circuit having:
- at least one delivery line of the carrier fluid,
- at least one return line of the carrier fluid, and
- a plurality of service lines connected directly or indirectly to said delivery line and to said return line and configured to serve respective rooms to be conditioned and/or heated, wherein each of said service lines comprises:
- at least one heat exchange unit,
- at least one flow regulator configured to control the flow of carrier fluid passing through the heat exchange unit, and
- at least one temperature sensor configured for allowing determination of a temperature difference between the carrier fluid in a first section of the service line upstream of said heat exchange unit and carrier fluid in a second section of the same service line downstream of the same heat exchange unit;

at least one central heat treatment unit located on the circuit, at least one control device comprising a processing unit connected or connectable to the flow regulator and to the temperature sensor or temperature sensors of each service line and configured to:

a) position the flow regulator in a first operating condition to which the following corresponds to:
- a first value ($\varphi_1$; $\Delta p_1$) of a flow parameter ($\varphi$; $\Delta p$) relative to the flow of carrier fluid passing through the heat exchanger, and
- a first value ($\Delta T_1$) of said temperature difference, b) position the flow regulator in a second operating condition to which the following corresponds
- an increase in the value of the flow parameter ($\varphi$; $\Delta p$) from said first value ($\varphi_1$; $\Delta p_1$) to a second value ($\varphi_2$; $\Delta p_2$) higher than the first value ($\varphi_1$; $\Delta p_1$) and
- a second value ($\Delta T_2$) of said temperature difference, c) calculate a value assumed by a control parameter (Pc) which is a function of one or more values assumed by said temperature difference in the transition of the flow regulator from said first to said second operating condition, wherein representing values of the temperature difference ($\Delta T$) vs. values of the flow parameter ($\varphi$; $\Delta p$) in a two-dimensional Cartesian system where the values of the flow parameter ($\varphi$; $\Delta p$) are reported on the abscissa and the values of the temperature difference on the ordinate ($\Delta T$), the control parameter is representative of an area under a characterizing curve or function which relates the temperature difference ($\Delta T$) with the flow parameter ($\varphi$; $\Delta p$);

d) compare said value of the control parameter (Pc) with a minimum threshold (S) to determine whether or not the value of the control parameter (Pc) is higher than said minimum threshold (S);

wherein in response to a determination in step d) that the value of the control parameter is higher than said minimum threshold, the control process executes the following steps:

e) position the flow regulator from the second operating condition in a subsequent operating condition which corresponds to:
- an increase in the value of the flow parameter ($\varphi$; $\Delta p$) from said second value ($\varphi_2$; $\Delta p_2$) to a subsequent value ($\varphi_{i+1}$; $\Delta p_{i+1}$) higher than the second value; and
- a variation from the second value ($\Delta T_2$) to a subsequent value ($\Delta T_{i+1}$) of said temperature difference, f) calculate a further value assumed by the control parameter (Pc) which is a function of one or more values assumed by said temperature difference in the transition of the flow regulator from the second operating condition to said subsequent operating condition, and g) compare said further value of the control parameter (Pc) with the minimum threshold (S) to determine whether or not the further value of the control parameter is higher than said minimum threshold;

wherein in response to a determination in step d) or step g) that the value of the control parameter (Pc) is less than or equal to said minimum threshold (S), then not changing the operating condition of the flow regulator in the direction of a further increase in the value of the flow parameter ($\varphi$; $\Delta p$).

27. An air conditioning and/or heating system comprising a carrier fluid distribution circuit having:
- at least one delivery line of the carrier fluid,
- at least one return line of the carrier fluid, and
- a plurality of service lines connected directly or indirectly to said delivery line and to said return line and configured to serve respective rooms to be conditioned and/or heated, wherein each of said service lines comprises:
- at least one heat exchange unit,
- at least one flow regulator configured to control the flow of carrier fluid passing through the heat exchange unit, and
- at least one temperature sensor configured for allowing determination of a temperature difference between the carrier fluid in a first section of the service line upstream of said heat exchange unit and carrier fluid in a second section of the same service line downstream of the same heat exchange unit;
at least one central heat treatment unit located on the circuit,
at least one control device comprising a processing unit connected or connectable to the flow regulator and to the temperature sensor or temperature sensors of each service line and configured to:
a) position the flow regulator in a first operating condition to which the following corresponds to:
a first value ($\varphi_1$; $\Delta p_1$) of a flow parameter ($\varphi$; $\Delta p$) relative to the flow of carrier fluid passing through the heat exchanger, and
a first value ($\Delta T_1$) of said temperature difference,
b) position the flow regulator in a second operating condition to which the following corresponds
an increase in the value of the flow parameter ($\varphi$; $\Delta p$) from said first value ($\varphi_1$; $\Delta p_1$) to a second value ($\varphi_2$; $\Delta p_2$) higher than the first value ($\varphi_1$; $\Delta p_1$) and
a second value ($\Delta T_2$) of said temperature difference,
c) calculate a value assumed by a control parameter (Pc) which is a function of one or more values assumed by said temperature difference in the transition of the flow regulator from said first to said second operating condition,
d) compare said value of the control parameter (Pc) with a minimum threshold (S) to determine whether or not the value of the control parameter (Pc) is higher than said minimum threshold (S);
wherein in response to a determination in step d) that the value of the control parameter is higher than said minimum threshold, the control process executes the following steps:
e) position the flow regulator from the second operating condition in a subsequent operating condition which corresponds to:
an increase in the value of the flow parameter ($\varphi$; $\Delta p$) from said second value ($\varphi_2$; $\Delta p_2$) to a subsequent value ($\varphi_{i+1}$; $\Delta p_{i+1}$) higher than the second value; and
a variation from the second value ($\Delta T_2$) to a subsequent value ($\Delta T_{i+1}$) of said temperature difference,
f) calculate a further value assumed by the control parameter (Pc) which is a function of one or more values assumed by said temperature difference in the transition of the flow regulator from the second operating condition to said subsequent operating condition, and
g) compare said further value of the control parameter (Pc) with the minimum threshold (S) to determine whether or not the further value of the control parameter is higher than said minimum threshold; and
wherein in response to a determination in step d) or step g) the value of the control parameter (Pc) is less than or equal to said minimum threshold (S), then not changing the operating condition of the flow regulator in the direction of a further increase in the value of the flow parameter ($\varphi$; $\Delta p$); and
wherein:
at said step c) calculating the value of the control parameter (Pc) comprises calculating an integral, between the first value of the flow parameter ($\varphi_1$; $\Delta p_1$) and the second value of the flow parameter ($\varphi_2$; $\Delta p_2$), of a characteristic function that correlates the temperature difference ($\Delta T$) with the flow parameter ($\varphi$; $\Delta p$); and
at said step g) calculating the value of the control parameter (Pc) comprises calculating an integral, between the second value of the flow parameter ($\varphi_2$; $\Delta p_2$) and the subsequent value of the flow parameter ($\varphi_{i+1}$; $\Delta p_{i+1}$), of the characteristic function that correlates the temperature difference ($\Delta T$) with the flow parameter ($\varphi$; $\Delta p$).

28. A method of controlling a flow of a carrier fluid through a service line of a conditioning and/or heating system,
the service line includes:
at least one heat exchange unit,
at least one flow regulator configured to control the flow of carrier fluid passing through the heat exchange unit, and
at least one temperature sensor configured to determine a temperature difference between the carrier fluid in a first section of the service line upstream of said heat exchange unit and the carrier fluid in a second section of the service line downstream of the same heat exchange unit;
the method comprises:
a) positioning the flow regulator in a first operating condition which corresponds to a first value ($\varphi_1$; $\Delta p_1$) of a flow parameter ($\varphi$; $\Delta p$) relative to the flow of the carrier fluid passing through the heat exchanger, and a first value ($\Delta T_1$) of said temperature difference,
wherein the flow parameter is
either a mass flow of the carrier fluid ($\varphi$) passing through the heat exchange unit, or
a pressure difference ($\Delta p$) between a first pressure intake of the service line upstream of a calibrated orifice and a second pressure intake of the same service line placed downstream of the calibrated orifice;
b) positioning the flow regulator in a second operating condition which corresponds an increase in the value of the flow parameter ($\varphi$; $\Delta p$) from said first value ($\varphi_1$; $\Delta p_1$) to a second value ($\varphi_2$; $\Delta p_2$) higher than the first value ($\varphi_1$; $\Delta p_1$), and to a second value ($\Delta T_2$) of said temperature difference,
c) calculating a value of a control parameter (Pc) which is a function of a plurality of values assumed by said temperature difference and of a plurality of values assumed by said flow parameter in a transition of the flow regulator from said first operating condition to said second operating condition,
d) comparing said value of the control parameter (Pc) with a minimum threshold (S) to determine whether or not the value of the control parameter (Pc) is higher than said minimum threshold (S);
wherein if following step d) of comparing said value of the control parameter (Pc) with the minimum threshold (S) it is determined that the value of the control parameter is higher than said minimum threshold, the control process execute the following steps:
e) positioning the flow regulator from the second operating condition in a subsequent operating condition which corresponds to: (i) an increase in the value of the flow parameter ($\varphi$; $\Delta p$) from said second value ($\varphi_2$; $\Delta p_2$) to a subsequent value ($\varphi_{i+1}$; $\Delta p_{i+1}$) higher than the second value; and (ii) a variation from the second value ($\Delta T_2$) to a subsequent value ($\Delta T_{i+1}$) of said temperature difference,
f) calculating a further value assumed by the control parameter (Pc) which is a function of one or more values assumed by said temperature difference in transition of the flow regulator from the second operating condition to said subsequent operating condition, and
g) comparing said further value of the control parameter (Pc) with the minimum threshold (S) to determine whether or not the further value of the control parameter is higher than said minimum threshold;

wherein in response to a determination in step d) or step g) that the value of the control parameter (Pc) is less than or equal to said minimum threshold (S), then not changing the operating condition of the flow regulator in the direction of a further increase in the value of the flow parameter ($\varphi$; $\Delta$p).

29. The method according to claim 28, wherein if, following step g), it is determined that the value of the control parameter is higher than said minimum threshold, the process provides for repeating steps e) to g) for further subsequent operating conditions of the flow regulator until at step g) of the cycle it is determined that the value reached by the control parameter (Pc) becomes equal or smaller than the minimum threshold (S).

30. The method according to claim 28, wherein if, following said step d) or said step g), it is determined that the value of the control parameter (Pc) is less than or equal to said minimum threshold (S), then the process provides for setting, as optimal working position to which the flow regulator is maintained at one of the following: (i) the last operating condition reached by the flow regulator during said cycle, (ii) the penultimate operating condition reached by the flow regulator during the cycle, and (iii) a condition obtained changing said last operating condition of the flow regulator by a prefixed step in the direction of a decrease in the value of the flow parameter ($\varphi$; $\Delta$p).

31. An air conditioning and/or heating system comprising a carrier fluid distribution circuit having:
   at least one delivery line of the carrier fluid,
   at least one return line of the carrier fluid, and
   a plurality of service lines connected directly or indirectly to said delivery line and to said return line and configured to serve respective rooms to be conditioned and/or heated,
wherein each of said service lines comprises:
   at least one heat exchange unit,
   at least one flow regulator configured to control the flow of carrier fluid passing through the heat exchange unit, and
   at least one temperature sensor configured for allowing determination of a temperature difference between the carrier fluid in a first section of the service line upstream of said heat exchange unit and carrier fluid in a second section of the same service line downstream of the same heat exchange unit;
at least one central heat treatment unit located on the circuit,
at least one control device comprising a processing unit connected or connectable to the flow regulator and to the temperature sensor or temperature sensors of each service line and configured to:
a) position the flow regulator in a first operating condition to which the following corresponds to:
   a first value ($\varphi_1$; $\Delta$pt$_1$) of a flow parameter ($\varphi$; $\Delta$p) relative to the flow of carrier fluid passing through the heat exchanger, and
   a first value ($\Delta$T$_1$) of said temperature difference, wherein the flow parameter is
   either a mass flow of the carrier fluid ($\varphi$) passing through the heat exchange unit, or
   a pressure difference ($\Delta$p) between a first pressure intake of the service line upstream of a calibrated orifice and a second pressure intake of the same service line placed downstream of the calibrated orifice;

b) position the flow regulator in a second operating condition to which the following corresponds
   an increase in the value of the flow parameter ($\varphi$; $\Delta$p) from said first value ($\varphi_1$; $\Delta$p$_1$) to a second value ($\varphi_2$; $\Delta$p$_2$) higher than the first value ($\varphi_1$; $\Delta$p$_1$) and
   a second value ($\Delta$T$_2$) of said temperature difference,
c) calculate a value assumed by a control parameter (Pc) which is a function of a plurality of values assumed by said temperature difference and of a plurality of values assumed by said flow parameter in the transition of the flow regulator from said first to said second operating condition,
d) compare said value of the control parameter (Pc) with a minimum threshold (S) to determine whether or not the value of the control parameter (Pc) is higher than said minimum threshold (S);
wherein in response to a determination in step d) that the value of the control parameter is higher than said minimum threshold, the control process executes the following steps:
e) position the flow regulator from the second operating condition in a subsequent operating condition which corresponds to:
   an increase in the value of the flow parameter ($\varphi$; $\Delta$p) from said second value ($\varphi_2$; $\Delta$p$_2$) to a subsequent value ($\varphi_{i+1}$; $\Delta$p$_{i+1}$) higher than the second value; and
   a variation from the second value ($\Delta$T$_2$) to a subsequent value ($\Delta$T$_{i+1}$) of said temperature difference,
f) calculate a further value assumed by the control parameter (Pc) which is a function of one or more values assumed by said temperature difference in the transition of the flow regulator from the second operating condition to said subsequent operating condition, and
g) compare said further value of the control parameter (Pc) with the minimum threshold (S) to determine whether or not the further value of the control parameter is higher than said minimum threshold;
wherein in response to a determination in step d) or step g) that the value of the control parameter (Pc) is less than or equal to said minimum threshold (S), then not changing the operating condition of the flow regulator in the direction of a further increase in the value of the flow parameter ($\varphi$; $\Delta$p).

32. The system according to claim 31, wherein if, following step g), it is determined that the value of the control parameter is higher than said minimum threshold, the process provides for repeating steps e) to g) for further subsequent operating conditions of the flow regulator until at step g) of the cycle it is determined that the value reached by the control parameter (Pc) becomes equal or smaller than the minimum threshold (S).

33. The system according to claim 31, wherein if, following said step d) or said step g), it is determined that the value of the control parameter (Pc) is less than or equal to said minimum threshold (S), then the process provides for setting, as optimal working position to which the flow regulator is maintained at one of the following: (i) the last operating condition reached by the flow regulator during said cycle, (ii) the penultimate operating condition reached by the flow regulator during the cycle, and (iii) a condition obtained changing said last operating condition of the flow regulator by a prefixed step in the direction of a decrease in the value of the flow parameter ($\varphi$; $\Delta$p).

* * * * *